United States Patent [19]

Ishibashi et al.

[11] Patent Number: 5,663,949
[45] Date of Patent: Sep. 2, 1997

[54] LINE PROTECTION SWITCHING SYSTEM IN DUPLEXED FIBER INTERFACE SHELF

[75] Inventors: Ryoichi Ishibashi; Tomiko Ito, both of Kawasaki; Kouki Mie, Fukuoka; Hiroya Kawasaki, Kawasaki, all of Japan

[73] Assignee: Fujitsu Limited, Kanagawa, Japan

[21] Appl. No.: 513,010

[22] Filed: Aug. 10, 1995

[30] Foreign Application Priority Data

Nov. 15, 1994 [JP] Japan .................................. 6-280302
Mar. 16, 1995 [JP] Japan .................................. 7-057426

[51] Int. Cl.⁶ ........................... H04J 1/16; H04L 1/00; H04B 3/38
[52] U.S. Cl. ..................... 370/220; 370/217; 370/219; 370/228; 340/825.01; 340/827
[58] Field of Search ....................... 370/16, 53, 217, 370/218, 219, 220, 221, 225, 226, 227, 228; 340/825.01, 827

[56] References Cited

U.S. PATENT DOCUMENTS

| | | | |
|---|---|---|---|
| 5,301,184 | 4/1994 | Uriu et al. | 370/16 |
| 5,398,236 | 3/1995 | Hemmady et al. | 370/16 |
| 5,436,886 | 7/1995 | McGill | 370/16 |
| 5,488,606 | 1/1996 | Kakuma et al. | 370/16 |

FOREIGN PATENT DOCUMENTS

| | | |
|---|---|---|
| 2-95031 | 4/1990 | Japan . |
| 2-189050 | 7/1990 | Japan . |
| 3-265317 | 11/1991 | Japan . |
| 3-258150 | 11/1991 | Japan . |
| 4-56436 | 2/1992 | Japan . |
| 4-267648 | 9/1992 | Japan . |
| 5-63698 | 3/1993 | Japan . |
| 5-292111 | 11/1993 | Japan . |

*Primary Examiner*—Douglas W. Olms
*Assistant Examiner*—Bnmmoussa Abdelhamid
*Attorney, Agent, or Firm*—Helfgott & Karas, P.C.

[57] ABSTRACT

A line protection switching system of a duplexed fiber interface shelf makes easily to reconcile conditions of duplexed fiber interface shelves, which perform line switching by employing APS bytes on an ISDN network. The line protection switching system has a pair of duplexed line switching controllers that send a line switching control signal to switch the transmission lines and a pair of duplexed line interface devices operatively connected to the pair of duplexed line switching controllers. An active interface device of the duplexed interface devices receives the line switching control signal only from an active line switching controller of the duplexed line switching controllers and echoes the received control signal back to the duplexed line switching controllers.

15 Claims, 30 Drawing Sheets

FIG.11
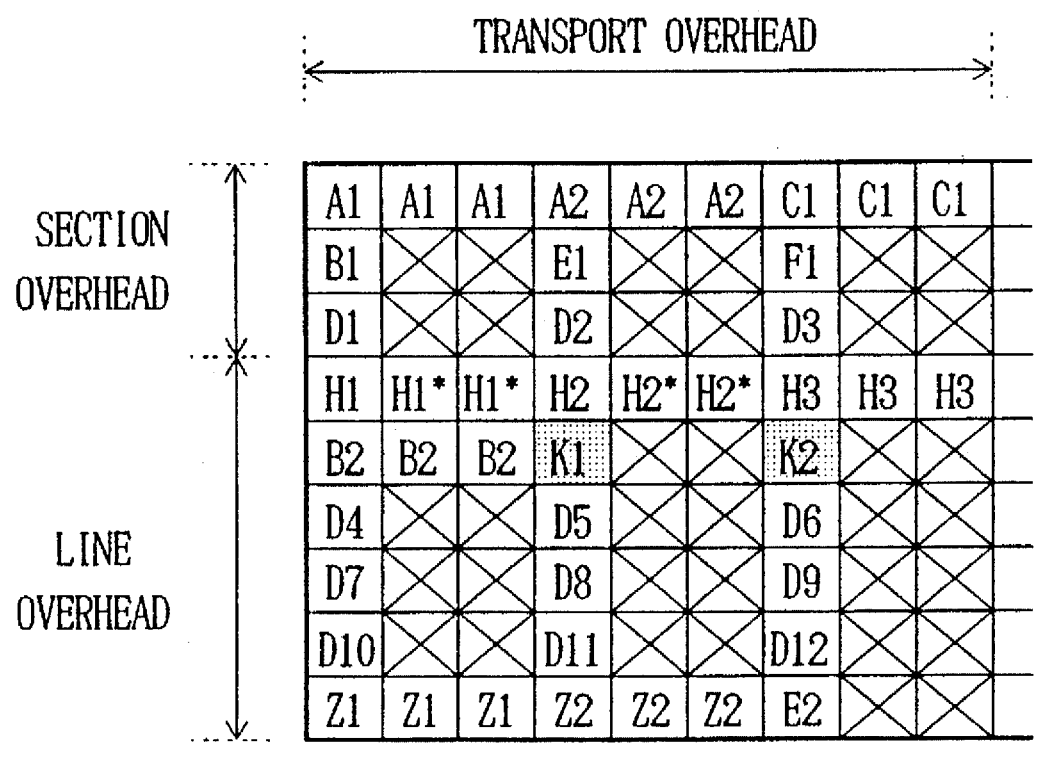
 : Undefined Overhead

FIG.12

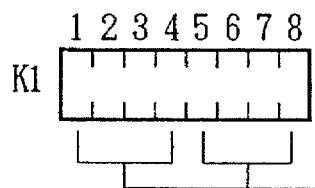

Bit 1-4 : Request Type

| Request Type | Detailed Explanation | Code |
|---|---|---|
| Fault<br>Deterioration | SF<br>SD | 1100<br>1010 |
| APS Control State | Do Not Revert | 0001 |
| External Request | Lockout of Protection<br>Forced Switch<br>Manual Switch<br>exercise (Not Support) | 1111<br>1110<br>1000<br>0100 |

Bit 5-8 : Channel

| Meaning | USE or the like | Code |
|---|---|---|
| Null | P-line  SF, SD<br>Lockout of Protection | 0 |
| Working Channel | W-line<br>(It becomes only 1<br>in 1+1 system) | 1-14 |
| Extra Traffic | Not used in 1+1 system | 15 |

Bit 1-4 : Channel

If CH No. of the received K1 byte is null, insert "null", whereas insert CH No. of channel, which is bridges to P-line. Code is the same as CH No. of K1 byte.

Bit 5 : Architecture

| Architecture | Code |
|---|---|
| 1+1 | 0 |
| 1:n | 1 |

Bit 6-8 : Operation

| Operation | Code |
|---|---|
| Bidirection | 101 |
| Unidirection | 100 |

FIG.15

| (a) | Used line (Working or Protection) |
|---|---|
| (b) | Reason for switching (command, fault, nothing) |
| (c) | Where switching is performed |
| (d) | Switched condition (success or failed) |
| (e) | Failure condition |
| | |

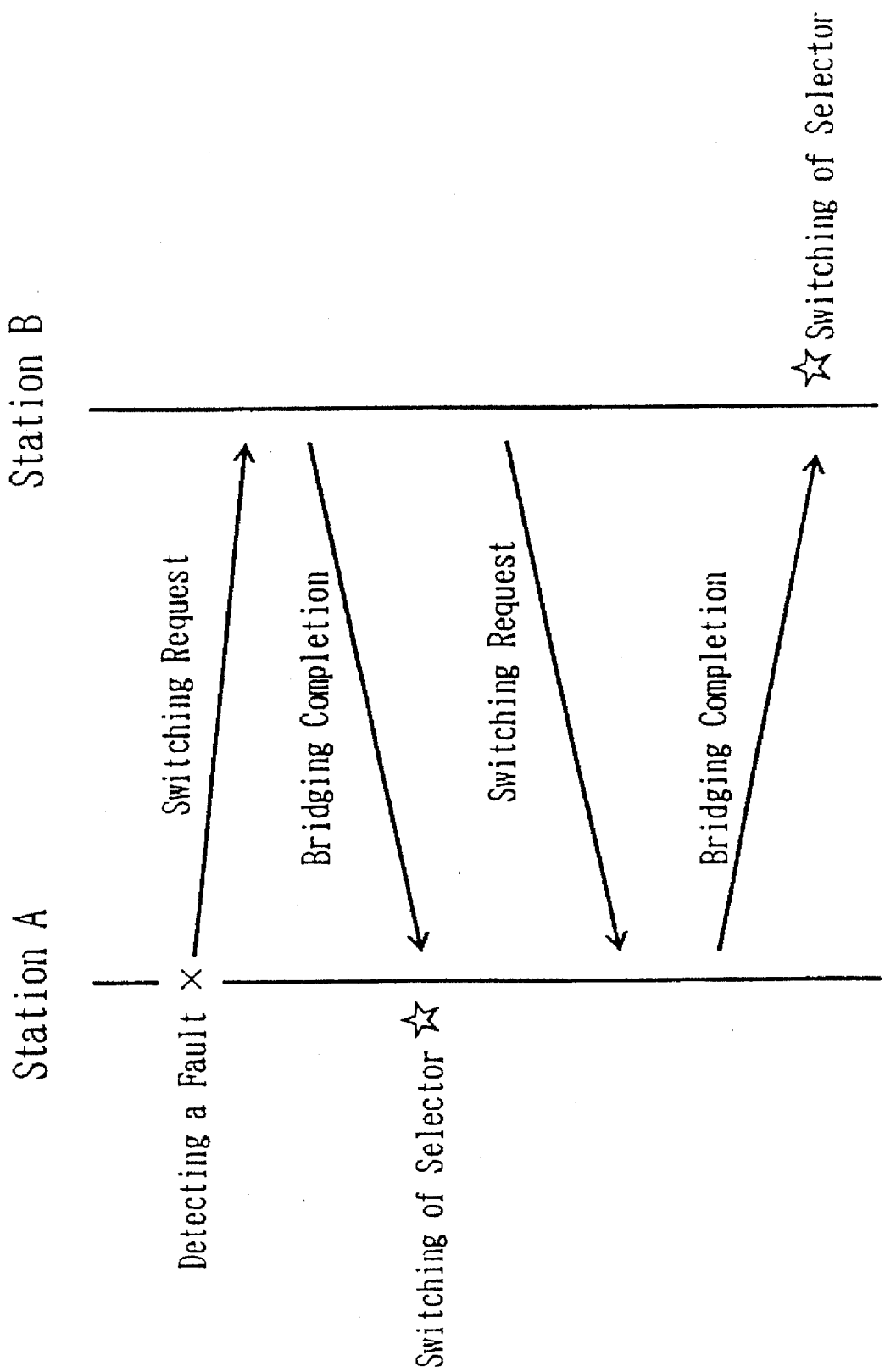

LINE PROTECTION SWITCHING SYSTEM IN DUPLEXED FIBER INTERFACE SHELF

BACKGROUND OF THE INVENTION

1. Field of the Invention

The present invention relates to a line protection switching control system in a duplexed fiber interface shelf. More particularly, it relates to a system, which is provided on an ISDN network and in which APS status can easily coincide between duplexed devices for switching transmission lines by the means of APS (Automatic Protection Switching).

2. Description of the Related Art

Commercial use of broadband-ISDN systems has started, and ATM switches employed for the systems have actively been developed in recent years. Referring now to FIG. 26, a structural example of a broadband-ISDN system is shown.

In FIG. 26, switches 1 mean ATM switches as an example. The ATM switches 1 are connected by transmission highways, for example, optical fiber lines 130. The switches 1 are also connected via a local switch, that is a concentrator, 131, or directly connected to the subscriber lines (user) or toll switches 132.

FIG. 27 is a structural block diagram, which shows an example of the ATM switch 1 illustrated in FIG. 26. The ATM switch 1 illustrated in FIG. 27 is formed of duplexed ATM switch modules 2 for exchanging ATM cells, a duplexed fiber interface shelf (FIFSH) 3 having duplexed fiber interface common cards 4 for controlling network highways connected to other switches and duplexed fiber interface cards (interface section) 5, duplexed subscriber line controllers 6 for controlling subscriber lines, duplexed network control signal processors 7, and an operation system 8.

In FIG. 27, the duplexed fiber interface cards 5 of the fiber interface shelf (FIFSH) 3 are constructed individually, according to an interface with each of the network highways, i.e. and is a fiber interface card for terminating a line format, so called as an individual section. The duplexed fiber interface common cards (FIFCOM) 4 control highways in common, which are known generically as common section. Further, the duplexed fiber interface common cards 4 have interfaces with the ATM switch modules 2.

In the above-described structure of ATM switch 1, network highways 130 linking between the ATM switches are duplexed. Simultaneously, the ATM switch module 2, the fiber interface common card 4, subscriber line controller 6, and a network control signal processor 7 respectively have a duplexed structure, to continue the communication by switching the status of ACT (active) or STB (standby), according to APS (Automatic Protection Switching) as a line protection system of network highways.

In this example, the APS means a system for self-controlling the line switching, without the control of operation system (OS) 8, in concurrent with detecting line faults. The line processing device self-controls switching of lines, so that the interval from the time of detecting faults to the time of completion of the switching can become shorter (less than 50 msec). The structure of the APS is prescribed in the Bellcore Recommendation TR-NWT-00253 or the like. It is also defined for the APS system to switch transmission lines with commands sent from the operation system (OS) 8. Levels of several ranks are provided for reasons of faults, a switching command or the like. These levels have predetermined priorities.

SONET (Synchronous Optical NETwork) is well known in North America, as an optical network for synchronizing an optical signal having the speed of 45M bits in the third-order group on digital hierarchies. K1 or K2 bytes in an overhead of a SONET signal frame is used to send and receive protocols to and from other switches to be connected.

In the structure of the fiber interface shelf 3, which is above discussed, the APS is performed by controlling, judging the priority, and administrating the status in the fiber interface common card 4, and switching the duplicated fiber interface cards 5.

In this example, the system can continually keep the operation of the duplicated fiber interface common cards 4 of both the ACT and STB groups in common, by performing same operation without distinguishing the ACT or STB group in the fiber interface common cards of the both duplexed groups.

However, there is a fault, which can be detected only by the common section of one group, among line faults including faults of the line devices itself detected by the fiber interface common card 4, i.e., common section. This will be explained in accompany with FIG. 28.

In FIG. 28, communication lines a to d are connected to the fiber interface common cards 4, i.e., common section and the fiber interface cards 5, i.e., individual section. The communication lines a and b are employed as a WORKING and a PROTECTION lines in a common section of #0 group, respectively. The lines c and d are employed as a WORKING and a PROTECTION lines in a common section of #1 group, respectively.

This means that when a fault F is generated in the communication line a, as illustrated in FIG. 28, the common section of #0 group recognizes it as a fault in the ACT (active) group, and performs line switching from the working line to the protection line. However, the common section of #1 group cannot detect this fault, which occurs in the #0 group.

If only one common section of one group can detect a fault as described above, the problems will be brought as follows. At first, the APS condition of the group, which has detected the fault becomes different from that of the other group, which has not detected the fault. Therefore, even if the fault is detected in only an ACT group, the switching can be normally performed. However, the common section in the SBY group cannot detect the fault, so that the APS condition of the SBY group becomes different from that of the ACT group.

If only the SBY group detects a fault, both the OS and the individual section act on the basis of the condition of common section in the ACT group, so that the APS condition is varied without switching actually.

Further, when initial driving or booting is performed from a power OFF state or the like, the fiber interface card 5 cannot recognize what the current condition in controlling the APS is. It has a counterbalancing disadvantage of the inconsistency between condition of the ACT and SBY groups, unless the condition of the common section for the ACT group is not in initialization or booting.

Furthermore, in FIG. 28 as described above, the protection group is employed due to the fault on a working group in the common section of #0 group, while the working group is employed without switching requirements in the common section of #1 group. Under the condition, when switching of common sections from the #0 group to the #1 group is performed, line switching from the protection line to the working line is performed due to the APS condition in the common section of the #1 group.

Accordingly, it is required to reconcile conditions between the ACT and SBY groups by copying information from the fiber interface common card 4 of the ACT (active) group to the fiber interface common card 4 of the SBY (standby) group. However, it is complex to copy the information of the condition from the ACT group to the SBY group, and it should be also considered that the condition may be varied while copying.

For example, as shown in FIG. 29, if the condition of the APS of the #1 group is copied to the fiber interface common card 4, i.e., a common section of the ACT group and line switching is performed, the common section in the ACT group cannot detect the restoration of a fault, even if the fault, which occurred in the connecting line c, has been restored. Thus, the APS condition in the common section of the ACT group cannot be changed.

When a fault is detected in only the SBY group, and the APS condition is copied to the ACT group, it is required to copy the APS condition from the SBY group to the ACT group when the common section of SBY group detects the fault restoration.

Meanwhile, the APS architecture has 1+1 and 1:n protection switching structures. Each of the structures has a uni-directional transmission mode and a bi-directional transmission mode. In the 1:n protection switching structure, one protection channel (line) is provided for n working channel (line).

In the 1+1 protection switching structure, a signal flows to both the working and protection lines. A selector selects either the working or protection line. In this example, as shown in FIG. 30, a bridge 22 and selector 23 are provided between devices, which support 1+1 structured bi-directional transmission mode. The bridge 22 is connected to both working and protection lines, and the selector 23 faced to the bridge 22 is switched and connected to the working or the protection line.

In this 1+1 line structure, the bridge 22 is fixedly connected to both the working and protection lines. Therefore, the switching can be completed immediately at the bridge 22. While the selector 23 sends a request for switching to a faced office using the K1 byte, a line number of K2 byte, which indicates a bridge completion is returned as a response, and the selector 23 confirms the correspondence between the line number of the sent K1 byte and that of the received K2 byte and completes switching at last.

This sequence is shown in FIG. 31. In this example, the bridge 22 is used as a station A and the selector 23 is used as a station B. If a fault is detected in the station A, the station A sends a request for switching line to the station B. When the station B receives this request, the station B returns the acknowledgement of bridge completion to the station A. In this time, the A station switches the selector. Further, the station B sends a request for switching lines to the A station. When the station B receives the acknowledge of bridge completion sent from the station A, the selector switching is performed.

In this case, 1:n protection switching structure has the same protocol of the procedure of switching as that of 1+1 line switching structure. It is one of the drawbacks of the conventional system that it takes too much time to switch lines, because line Switching should be performed after receiving a response from the faced station.

SUMMARY OF THE INVENTION

Accordingly, the present invention is intended to remedy these drawbacks of the above-described line protection switching. It is an object of the present invention to provide a line protection switching system of duplexed devices, in which it is realized to reconcile a condition of ACT (active) group to that of SBY (standby) group at initial driving or booting in a fiber interface shelf of STB (standby) group.

Further, it is an object of the present invention to provide a line protection switching system, in which line switching is performed by a hardware or a firmware, without an interposition of software to complete switching within an interval, for example, 50 ms, until completing the prescribed line switching at the time when APS is driven.

Furthermore, it is an object of the present invention to provide a line protection switching system, in which it is realized to reduce time required for switching lines by continually informing bridge conditions of both lines to the faced side in a 1+1 structured protection switching.

To approve the above-described objects, a line protection switching system of duplexed device according to the present invention has a basic structure as follows;

A line protection switching system according to the present invention has a duplexed line switching controller and a duplexed line switching controller to be controlled. The duplexed line switching controller and the duplexed line switching controller to be controlled respectively include transmitters and receiving circuits of line switching control signals.

The transmitters of the line switching controller to be controlled receive line switching control signals sent from the line switching controller of an ACT (active) group, and echoes the received line switching control signal back to the line switching controller.

The line switching controller of the ACT (active) group is employed as a line control section. The line control section of ACT (active) group informs the APS condition to the control section of SBY (standby) group as a predetermined interval goes by. Therefore, the APS condition of both groups can continually reconcile to that of the faced group.

More objects of the present invention will be clear by the following description of the preferred embodiments accompanied with drawings.

BRIEF DESCRIPTION OF THE DRAWINGS

FIG. 11 is a diagram for explaining the position of K1/K2 byte in the overhead.

FIG. 12 is a diagram for explaining the definition of K1 byte.

FIG. 15 is a diagram for explaining contents of condition table.

FIG. 31 is an explanatory diagram of switching sequence in accompanying with FIG. 30.

DESCRIPTION OF THE PREFERRED EMBODIMENT

Figure 1:
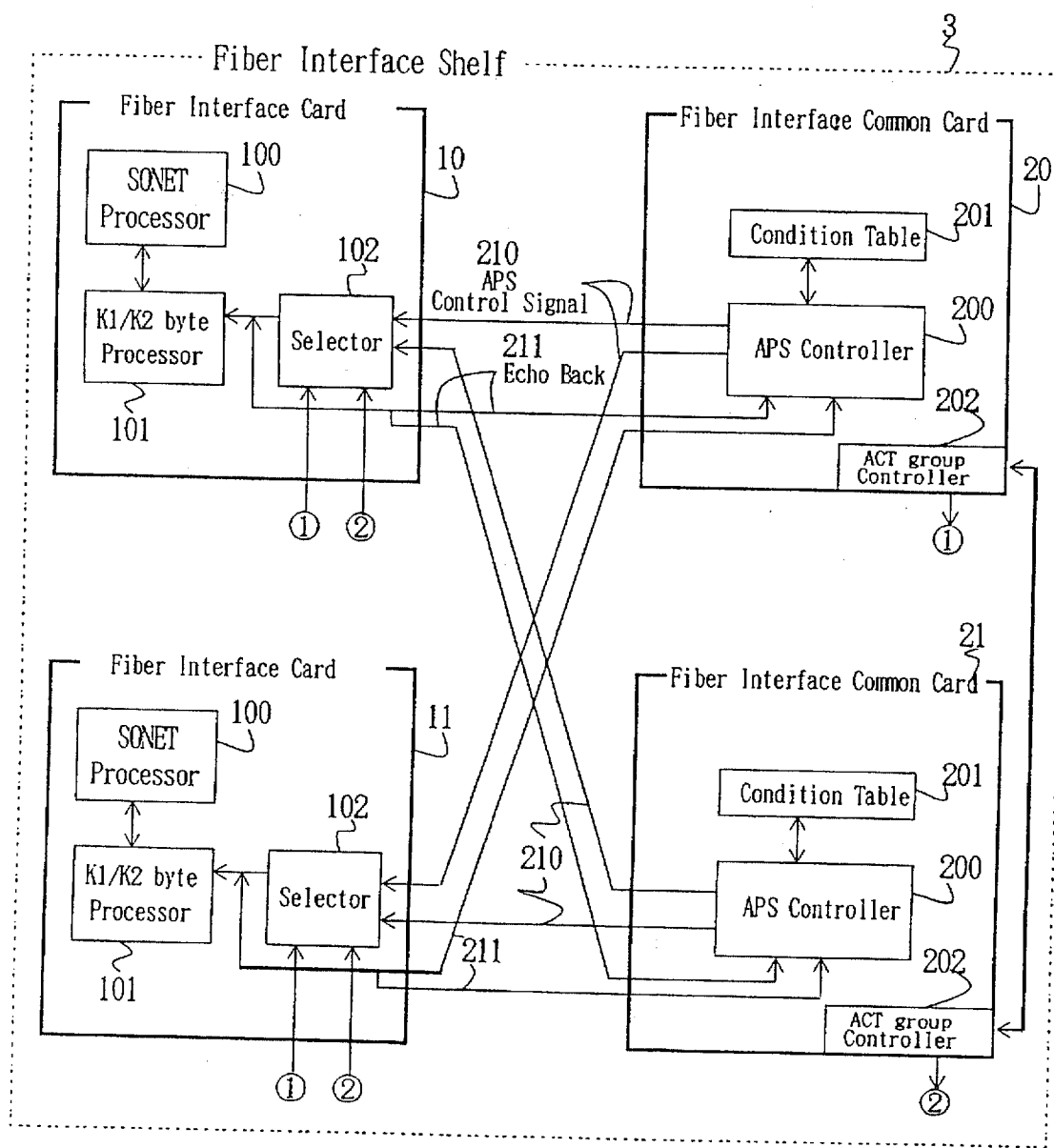
FIG. 1 is a diagram for explaining the principle of the first feature according to the present invention.

Embodiments according to the present invention will be explained in accompanying with the drawings. Throughout the following descriptions, the same reference numerals are used to denote and identify corresponding or identical components in the drawings.

Referring now to FIG. 1, a block diagram for explaining the first feature of the present invention is shown. Shown is an example of a line protection switching system of a duplexed structure, in which it is realized to reconcile a condition in the fiber interface common card of a SBY (stanby) group at initial driving to the condition of the fiber interface common card of an ACT (active) group.

Figure 27:
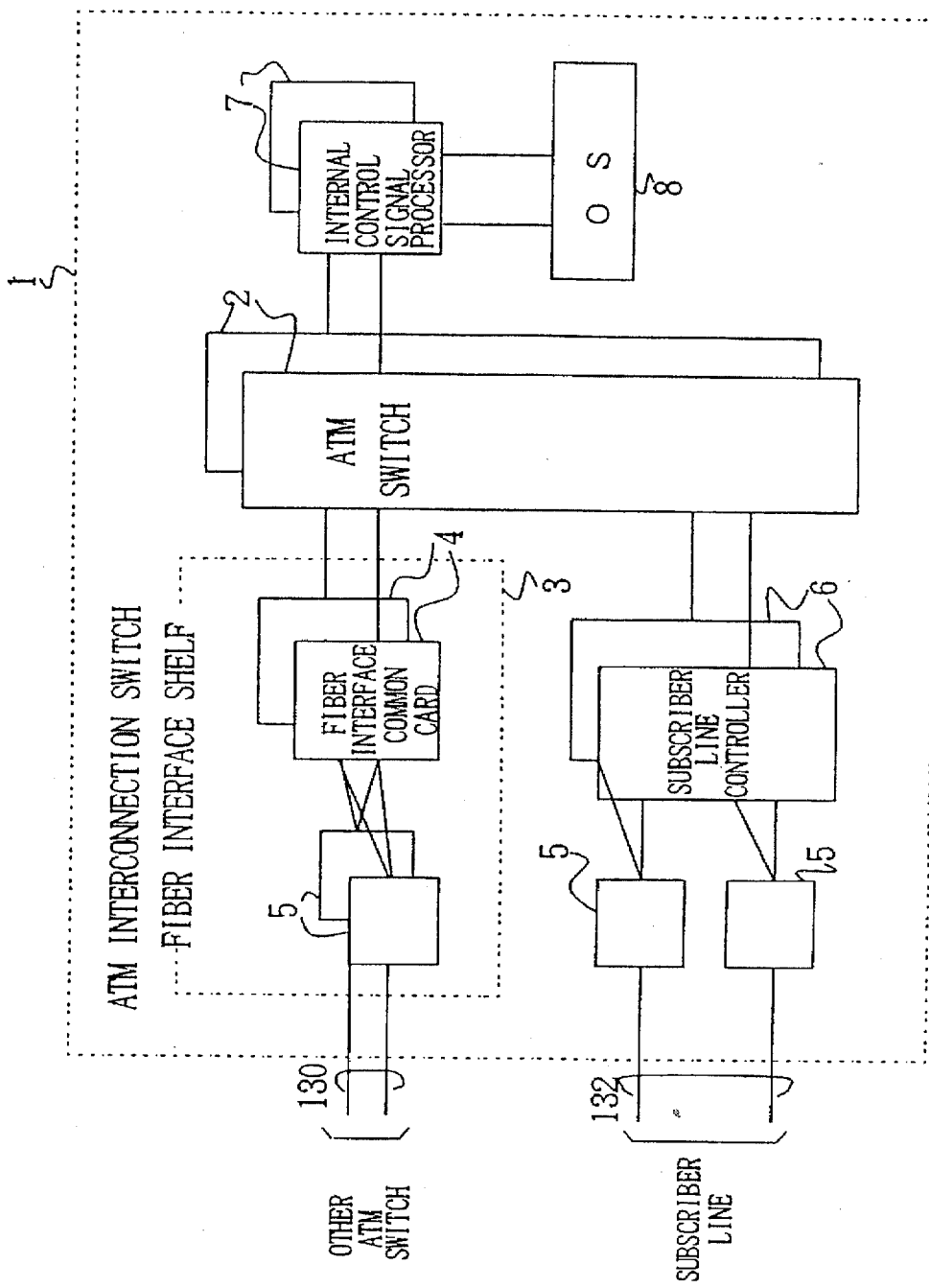
FIG. 27 is an explanatory diagram of a structural example of ATM switch.
Figure 28:
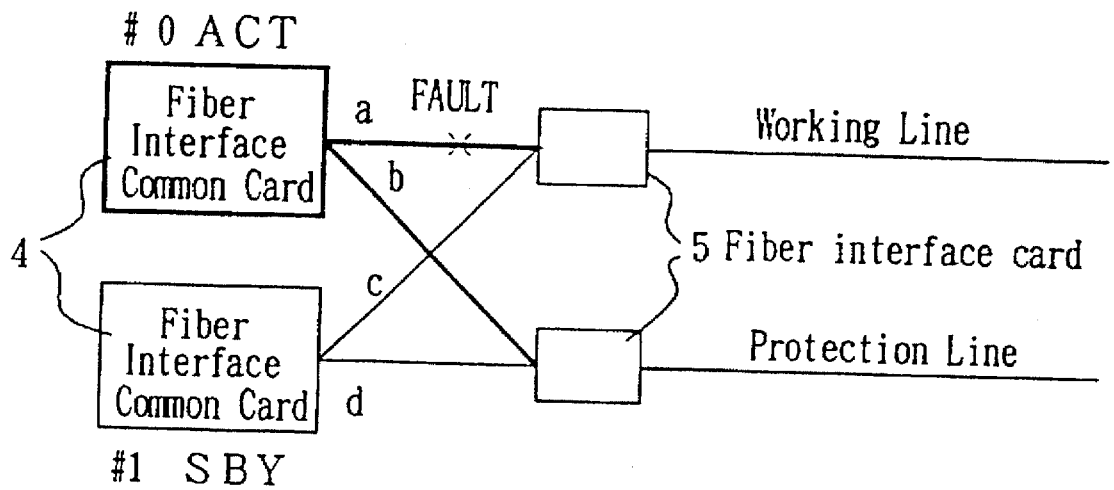
FIG. 28 is an explanatory diagram of a problem in the case where a fault can be detected in only one group.
Figure 29:
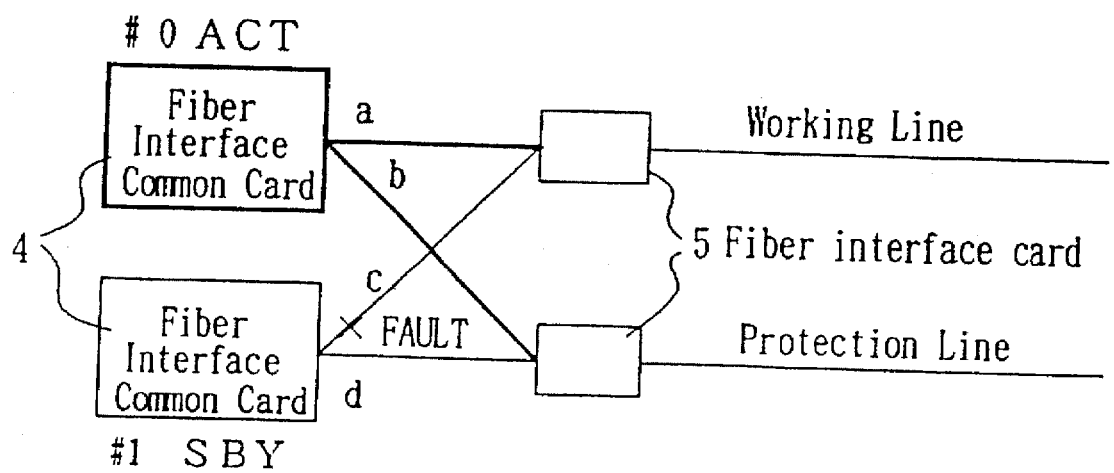
FIG. 29 is an explanatory diagram of a problem of copying APS.
Figure 30:
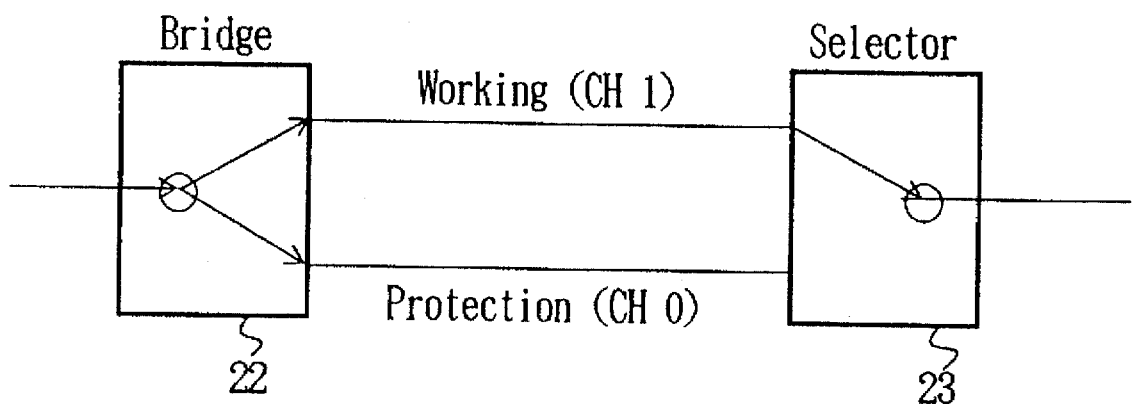
FIG. 30 is an explanatory diagram of the conventional 1+1 switching system.

In FIG. 1, fiber interface cards 10 and 11, i.e., individual sections, which interface with network transmission paths 130 (refer to FIG. 27) are duplexed, and are provided per a line. Fiber interface common cards 20 and 21, i.e., common sections, which interface with ATM switches 2 (refer to FIG. 27) are similarly duplexed.

Accordingly, the duplexed fiber interface cards 10 and 11 are cross-connected to the fiber interface common cards 20 and 21, according to the condition of a fault or the like.

Further, a main signal flowing is omitted, and only sections directly related to the present invention are shown in FIG. 1.

Both the duplex structured fiber interface cards 10 and 11 have a same structure and have a SONET processor 100, K1/K2 byte processor 101 and a selector 102. Additionally, both the duplex structured fiber interface common cards 20 and 21 have a same structure and have an APS controller 200, a condition table 201 and an ACT group controller 202.

The SONET processor 100 in the fiber interface cards 10 and 11 have an O/E convertor that converts an optical signal outputted from a line to an electrical signal, an E/O convertor that reversely converts an electrical signal to an optical signal outputted from the fiber interface common card, a serial/parallel convertor and a function of controlling synchronization of SONET frame.

The SONET processor 100 converts an optical signal sent from the line that is connected to other ATM switches. The processor 100 further performs the synchronization of a SONET frame and the separation of K1/K2 byte in the overhead section. Additionally, a signal is outputted from the SONET processor 100 as a main signal in the upward direction and sent to the fiber interface common card 20.

Simultaneously, the SONET processor 100 performs the synchronization of the SONET frame and the insertion of K1/K2 bytes to the overhead section to the main signal in the downward direction sent from the fiber interface common card 20. Then, the signal is converted to an optical signal and sent out to the lines.

Further, in FIG. 1, the fiber interface card 10 has a selector 102. The fiber interface common card 20 has an APS controller 200, a condition table 201, and an ACT group controller 202. The condition table 201 in the fiber interface common card 20 stores information about the updated line condition, for example, an APS control condition, such as an information which group is employed as active, as later discussed.

The APS controller 200 sends an APS control signal 210 to the fiber interface cards-10 and 11 of working and protection groups via an additional transmission path besides the transmission path for the main signal. Selectors 102 in the fiber interface cards 10 and 11 of the working and protection groups select the APS control signal 210 sent from the active fiber interface common card 20 or 21 and send the signal 210 to the K1/K2 byte processors 101.

The K1/K2 byte processors 101 create K1/K2 bytes, based on the APS control signal sent as described above, and send the bytes to the SONET processors 100.

Further, the first feature of the present invention is that the selectors 102 echo the APS control signal sent from the fiber interface common card 20 or 21 back to the fiber interface common cards 20 and 21 as it is. Accordingly, the fiber interface common cards 20 and 21 store the APS control signal, which is echoed back, in the condition tables 201, under the control of the APS controllers 200.

Therefore, the APS control signal stored in the control tables 201 is continually updated, so that both of the fiber interface common cards 20 and 21 can commonly hold the same updated APS control signal.

Consequently, the initially driven fiber interface common card of the STB (standby) group refers to the data, which is echoed back, and reconciles the APS condition to that of the fiber interface common card of the ACT (active) group. It is also possible to add a signal for reconciling the condition between fiber interface common cards of both groups, besides a signal for instructing the fiber interface card. Further, selectors 102 of the fiber interface cards 10 and 11 of the working and protection groups are controlled on the basis of a signal showing ACT condition sent from either one of the ACT controllers 202 in the fiber interface common cards 20 and 21.

Figure 2:
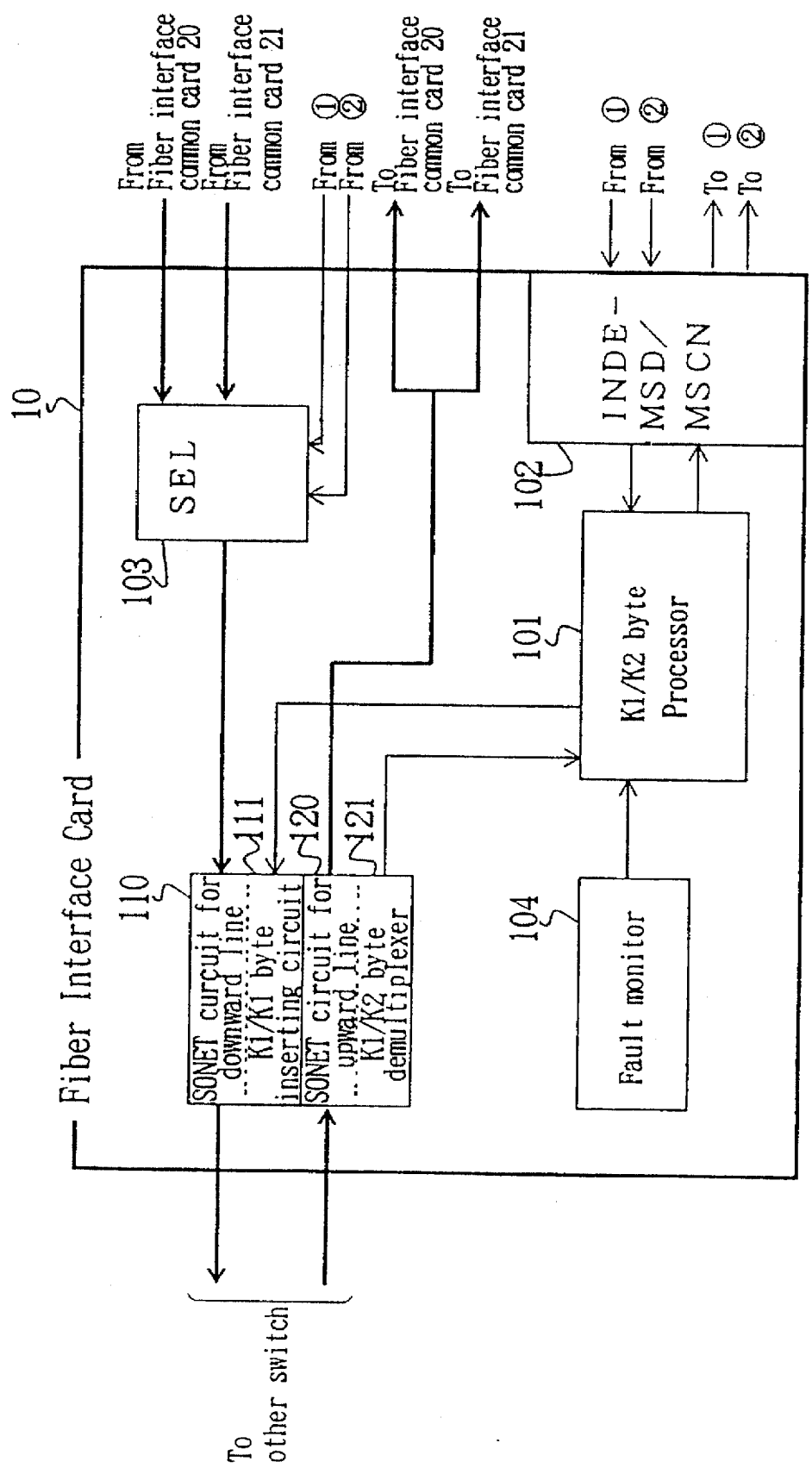
FIG. 2 is a block diagram showing a structural example of the fiber interface card shown in FIG. 1.

FIG. 2 is a block diagram showing a structural example of the fiber interface card of the working group shown in FIG. 1. As described above, the fiber interface card 11 of the protection group has the same structure.

A SONET processor 100 shown in FIG. 1 has a processing circuit 110 for a downward line and a processing circuit 120 for an upward line. Further, each of the SONET processing circuits 110 and 120 has a K1/K2 byte inserting circuit 111 and a K1/K2 byte demultiplexer 121, respectively.

A selector 103, which is not shown in FIG. 1, controls the switching to input main signals sent from the fiber interface common cards 20 and 21, and output the main signal sent from the fiber interface common card, which is ACT (active). Further, the main signal is inputted to the K1/K2 byte inserting circuit 111 for a downward line in the SONET processor 110. K1/K2 bytes are inserted to the main signal in the processor 110 by the K1/K2 byte inserting circuit 111 and sent out. In this case, the K1/K2 bytes are also sent via the line, which is a line of the STB group.

Main signals sent from other switches in the upward direction are commonly outputted to the fiber interface common cards 20 and 21, which are the ACT and SBY groups, via the processing circuit 120 in the SONET processor 100 shown in FIG. 1.

Further, the K1/K2 demultiplexer 121 demultiplexes K1/K2 byte from the main signal, and inputs demultiplexed K1/K2 bytes to the K1/K2 byte controller 101. A fault monitoring signal sent from the fault monitor 104 is inputted to the K1/K2 controller 101. Accordingly, the K1/K2 controller 101 reflexes the result of monitoring fault to the content of K1/K2 bytes, according to a definition of K1/K2 bytes, which are later discussed.

An internal control signal transmitter 102 includes a selector as described in FIG. 1 that selects an internal control signal of the fiber interface common card, which is ACT (active), from the internal control signals including K1/K2 byte sent from the fiber interface common cards 20 and 21. Further, the transmitter 102 sends an internal control signal including K1/K2 bytes to the fiber interface common cards 20 and 21.

Figure 3:
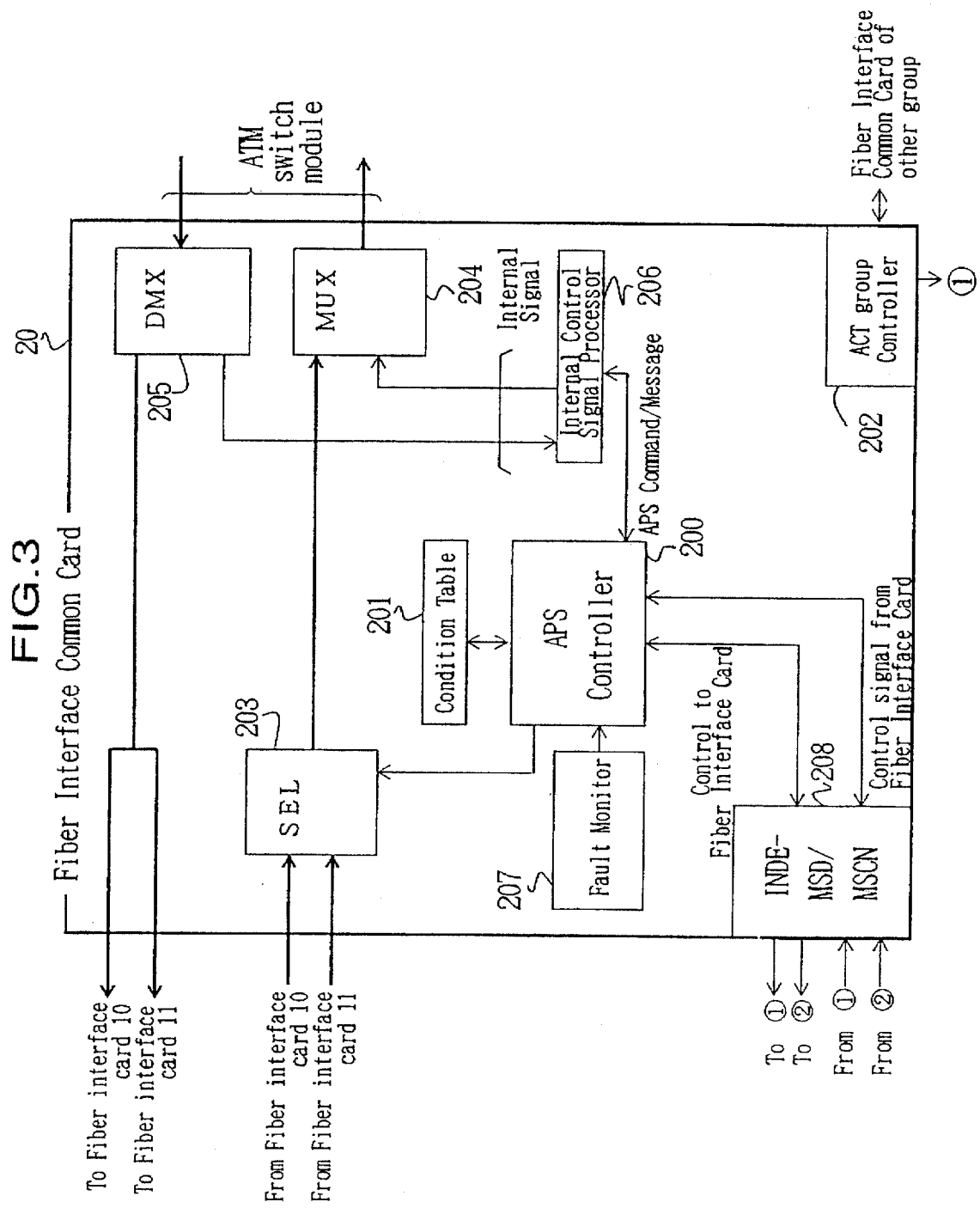
FIG. 3 is a block diagram showing a structural example of the fiber interface common card shown in FIG. 1.

FIG. 3 is a block diagram showing a structural example of the fiber interface common cards 20 and 21 shown in FIG. 1. In FIG. 3, a demultiplexer 205 selects an internal control signal from the signals sent from the ATM switch module 2.

A selector 203 switches and outputs the signal, which is ACT (active), selected from the main signals received from the working and protection fiber interface cards 10 and 11. The main signal selected in the selector 203 is inputted to a multiplexer 204. Then, the internal control signal is mul-ti-inserted to the main signal and is sent out to the ATM switch module 2.

An APS controller 200 controls the switching of selector 203, based on an information stored in the condition table memory 201, a fault monitoring data sent from the fault monitor 207 for various devices, an APS command/message, which is an output of the internal control signal processor 206 for processing the internal control signal demultiplexed by the demultiplexer 205, and a control signal including K1/K2 byte sent from the fiber interface cards 10 and 11, and stores the updated data to the condition table 201.

An internal control signal transmitter 208 in the fiber interface common card 20 is corresponding to the internal control signal transmitter 102 in the fiber interface card 10 shown in FIG. 2. The circuit 208 sends an APS control signal to the working and protection fiber interface cards 10 and 11, and receives the control signals sent from the fiber interface cards 10 and 11. An ACT controller 202 controls the selector 102 in the fiber interface card 10 to switch to the ACT (active) side, by synchronizing with a fiber interface common card of the other group, which is the protection fiber interface common card 21 in the case shown in FIG. 3.

The first feature of the present invention is to control the signal transmitted via the internal control signal transmitter 102 in the working and protection fiber interface cards 10 and 11 and the internal control signal transmitter 208 in the fiber interface common cards 20 and 21 shown in FIGS. 2 and 3, as described above.

The internal control signal transmitters 102 in the fiber interface cards 10 and 11 receive the control signals sent from the internal control signal transmitters 208 in the fiber interface common cards 20 and 21, while the internal control signal transmitters 208 in the working/protection fiber interface cards 10 and 11 receive the control signals sent from the internal control signal transmitters 102 in the working and protection fiber interface cards 10 and 11.

More particularly, the internal control signal transmitter 102 in the working/protection fiber interface card 10 or 11 commonly echoes the control signal sent from the working/protection fiber interface card 10 or 11 and the control signal sent from the internal control signal transmitter 208 in the fiber interface common card 20 or 21 back to the fiber interface common cards 20 and 21, as they are.

Consequently, the fiber interface common cards 20 and 21 store the echoed-back control signal including K1/K2 byte in the condition table 201. Therefore, it is possible that both the working and the protection fiber interface common cards 20 and 21 continually hold the control condition, commonly.

Figure 4:
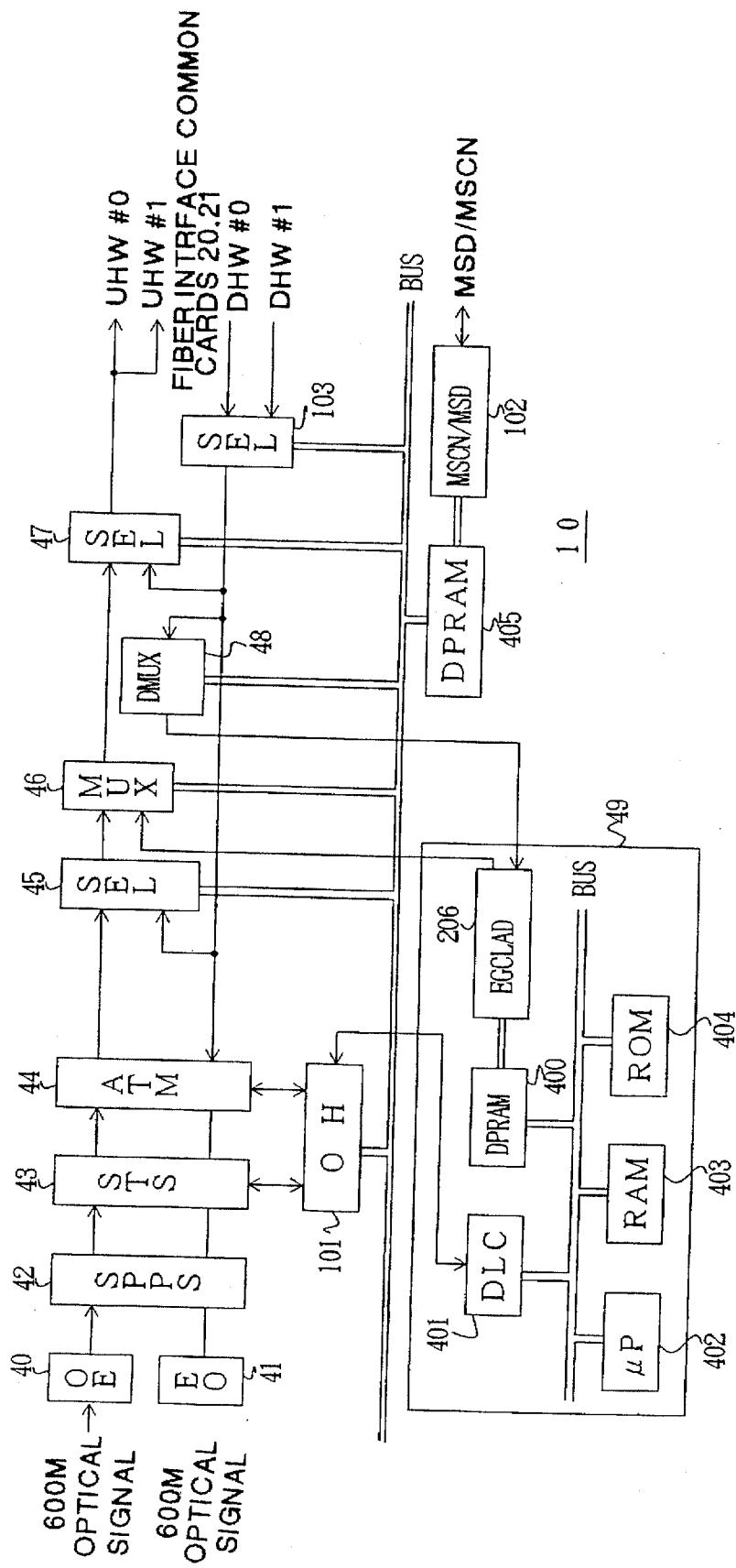
FIG. 4 is a block diagram showing a detailed structural example of the fiber interface card.

FIG. 4 is a block diagram showing the detailed structural example of the fiber interface card 10 of the working group. At first, a flowing in the upward direction toward the fiber interface common card from the fiber interface card will be explained in FIG. 4. Reference numerals 40 and 41 are an optical/electrical converter and an electrical/optical converter, respectively.

The optical/electrical convertor 40 converts an inputted optical signal of 600 Mbps sent from a line linked to the other switches to an electrical signal. Then, a serial/parallel or a parallel/serial convertor 42 converts the converted signal to a parallel signal.

Then, the converted parallel signal is inputted to the SONET processor 43 to control the SONET frame synchronization. The frame signal performed the frame synchronization is inputted to the ATM cell processor 44. The SONET processor 43 inputs the frame signal performed the frame synchronization to the ATM cell processor 44, and branches K1/K2 byte positioned on the overhead section based on a control signal from the overhead section controller 101.

A selector 45 turns the flowing of test signals. The selector 45 returns the test signals for a downward direction toward the fiber interface card from the fiber interface common card, back to the fiber interface common card.

The multiplexer 46 multiplexes the internal control signal sent from the internal control signal processor (EG-CLAD) 206 to the main signal sent from the ATM cell processor 44. Further, the selector 47 returns the test signal for the downward direction as well as the selector 45. The selectors 45 and 47 are controlled to output the main signals in a normal state.

In this way, the provision of the plurality of selectors makes easy to specify faults, by returning back the test signal on each selector. The output of selector 47 is commonly inputted to the fiber interface common cards 20 and 21.

In FIG. 4, a main signal in the downward direction sent from the fiber interface common cards 20 and 21 are inputted to the selector 103. The signal sent from the fiber interface common card of the ACT (active) group is selected from the main signals and is outputted to the demultiplexer 48. The signal from the fiber interface common card of the ACT (active) group is also inputted to the ATM cell processor 44.

The ATM cell processor 44 inserts K1/K2 bytes to the overhead section of the SONET frame, under the control of the overhead section controller 101. Further, the output from the ATM cell processor 44 is performed the frame synchronization in the SONET processor 43. Then, the signal is converted to the serial signal in the serial/parallel or parallel/serial converter 42. The SONET processor 43 performs the frame synchronization to the output from the ATM cell processor 44. Then, the serial/parallel or parallel/serial convertor 42 converts the signal to an serial signal.

The converted serial signal is further converted to an optical signal in the electrical/optical converter 41, and is sent out to the other switch as an optical signal of 600 Mbps.

Further, in FIG. 4, the internal control signal processor 49 has a data link control circuit (DLC) 401, which has an interface function of the control signal with the overhead controller 101 operated under the control of a micro processor 402, a work RAM 403 for the micro processor 402, and a ROM 404 for storing a control program. Further, in the processor 49, an internal control signal processor (EG-CLAD) 206 connected via a dual port RAM 400 is provided.

In this embodiment, the internal control signal processor (EG-CLAD) 206, which is connected to a multiplexer 46 and a demultiplexor 48, transmits control signals for totally controlling the internal devices including the ATM switch modules 2.

Further, the internal control signal transmitter 102 is connected to the internal control signal transmitter 208 in the fiber interface common cards 20 and 21, and is connected to a bus (BUS) via a dual port RAM 405. Further, the internal control signal transmitter 102, as described above, has a selector. The selector of the transmitter 102 selects and receives the signal sent from the active fiber interface common card, which is selected by the APS control signals sent from the fiber interface common cards 20 and 21.

Furthermore, the selecting operation of the above-described selector 103 is performed according to the APS control signal outputted from the internal control signal transmitter 102.

Figure 5:
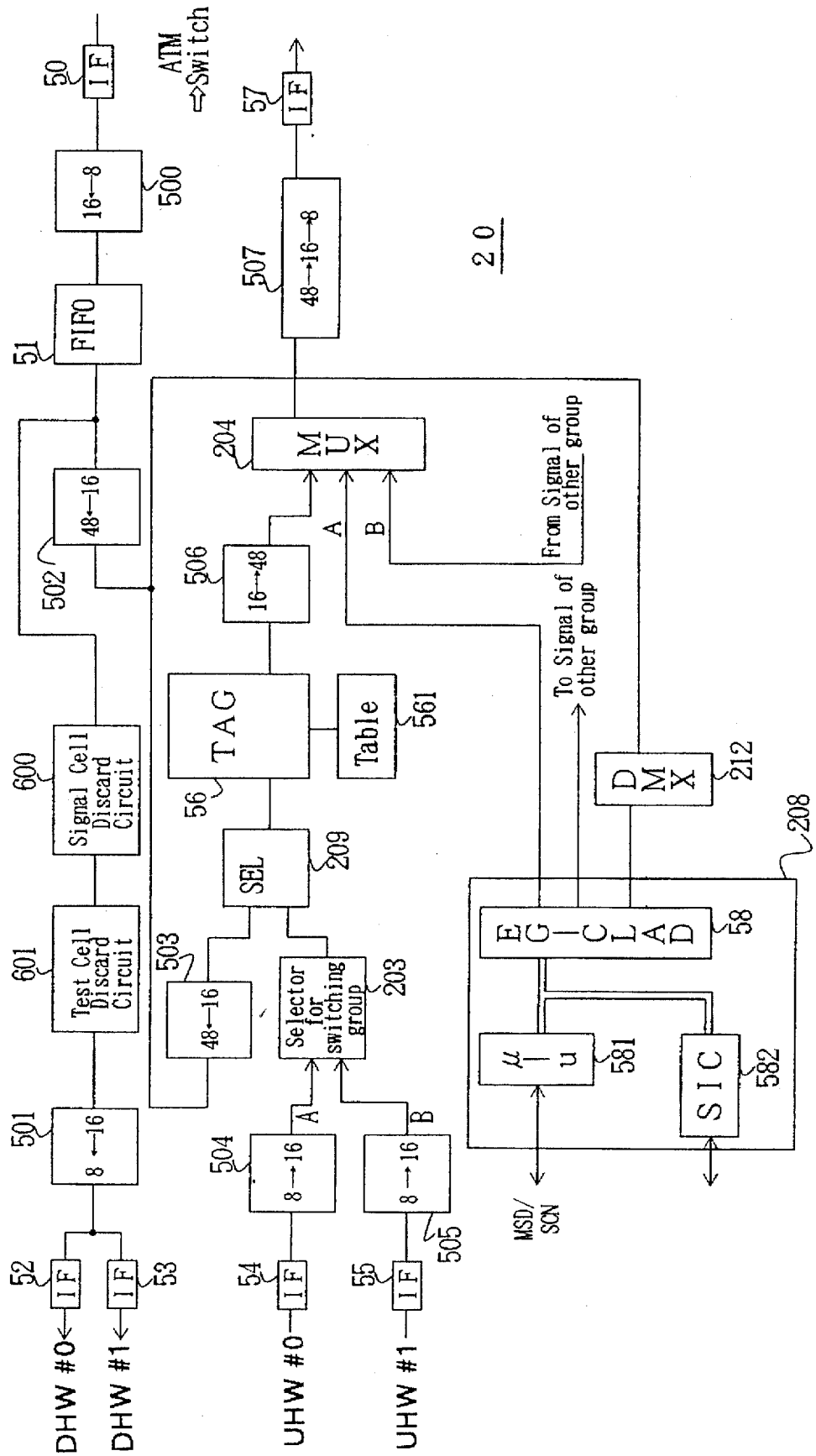
FIG. 5 is a block diagram showing a detailed structural example of the fiber interface common card.

FIG. 5 is a block diagram showing a detailed structural example of the fiber interface common cards 20 and 21. A main signal in the downward direction sent from the ATM switch module 2 is inputted to an interface circuit 50. Then, a clock converter 500 converts the signal to 16-bits signal. That is, bit number of data buses is converted by converting a clock frequency of the signal.

Further, 16-bit signal sequence is inputted to a FIFO memory 51, and is outputted after buffering. The FIFO memory 51, which has a function of a clock converting buffer memory converts an input signal clock to a system clock.

The signal cell discard circuit 600 discards the internal control cell from the output of FIFO memory 51, not to flow the cell to the fiber interface cards 10 and 11. Further, a test cell discard circuit 601 similarly discards the test cell for the loop back testing.

The main signal, from which a signal cell and test cells are removed, is converted to a 8-bits signal in a clock converter 501, again. Then, the converted signal is inputted to a selector 103 in the working/protection fiber interface card 10 or 11, via interface circuits 52 and 53.

The output of the FIFO memory 51 is branched and inputted to a clock converter 502. Then, the signal is converted to 48-bits signal. If the 48-bits signal is a test cell for loop back testing, the signal is inputted to the clock convertor 503, returned to 16-bit signal sequence there, and inputted to the selector 209. The selector 209 switches the test cell for looping back sent from the clock convertor 503 to the main signal in the upward direction, which is later discussed, and returns the test cell to the ATM module 2 (looping back).

Further, the demultiplexer 212 extracts an internal control cell from the output of the clock converter 502. Then, the internal control cell is inputted to an EG-CLAD circuit 58 composing one section of the internal control signal transmitter 208. The EG-CLAD circuit 58 resolves and reconstructs the internal control cell. The micro processor 581 is connected to the EG-CLAD circuit 58 via a bus.

More particularly, the micro processor 581 is connected to the internal control signal transmitter 102 in the fiber interface card 10 or 11, relating to the feature according to the present invention. Then, the EG-CLAD circuit 58 sends a control signal to control the switching in the selector 105 of the fiber interface cards 10 and 11, described above, based on the internal control cell for which resolving and reconstruction is performed.

A serial interface control circuit (SIC) 582 is a serial interface for controlling communication with SIC in the other group.

Referring now to FIG. 5, the main signals in the upward direction sent from the selector 47 in the fiber interface cards 10 and 11 are inputted to the clock convertors 504 and 505, via the interface circuits 54 and 55 of working and protection groups. The clock convertors 504 and 505 convert 8-bits main signals to 16-bits signals.

The outputs from the clock convertors 504 and 505 are inputted to the selector 203 for switching groups. Then, the output of the side receiving cells is selected and outputted to switch the group of the fiber interface common card.

The output of the selector 203 is inputted to the selector 209 and is switched from the signal for looping back test, described above. The output of the selector 209 is inputted to a TAG allocation circuit 56 to perform TAG allocation. That is, a TAG value for specifying a routing for switching in the ATM switch is found by retrieving the table 561 from the values of VPI (Vertical Path Identifier) and VCI (Vertical Channel Identifier) included in the main signal. Then, the TAG value is allocated to the cell in the frame.

The output of the TAG allocation circuit 56 is further converted to the 48-bits signal of a higher-speed clock in the clock convertor 506. Then, a main signal from the clock convertor 506, a signal A outputted from the EG-CLAD circuit 58 and a signal B outputted from the EG-CLAD circuit 58 of other group are inputted to the multiplexer 205.

The multiplexer 204 multiplexes the main signal from the clock convertor 506 with one selected from the signals A and B outputted from the above-described EG-CLAD circuit 58 to switch the groups of the fiber interface cards, and the selected one belongs to the group which takes into the cells of the main signal.

The signal A or B, which is multiplexed with the main signal in the multiplexer 204 is converted from 8-bits to 48-bits in the clock convertor 507, and is sent to the ATM switch side, via an interface circuit 57.

Figure 6:
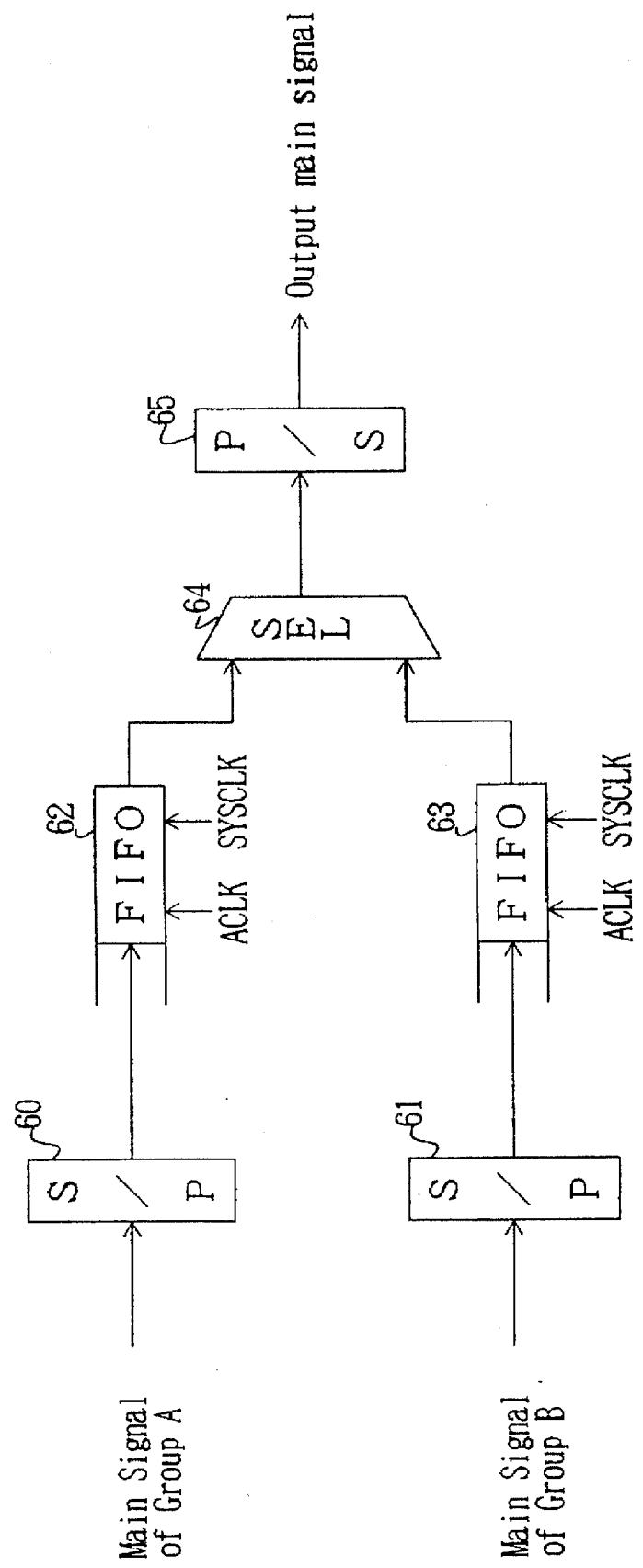
FIG. 6 is a block diagram of a structural example of a selector.

FIG. 6 is a block diagram illustrating a structural example commonly employed for the selectors 45, 46, 105, 203 and 204 shown in FIG. 5. The main signals in A (working) and B (protection) groups are respectively inputted to the serial/parallel convertors 60 and 61.

The outputs of the serial/parallel convertors 60 and 61 are inputted with a timing of A clock (ACLK) to the FIFO memories 62 and 63, and are outputted with a timing of system clock (SYSCLK). That is, the clock of signals is converted to the system clock.

The selector 64 selects the outputs of the serial/parallel convertors 60 and 61. The serial/parallel convertor 65 converts the selected output to a serial signal and outputs it.

Figure 7:
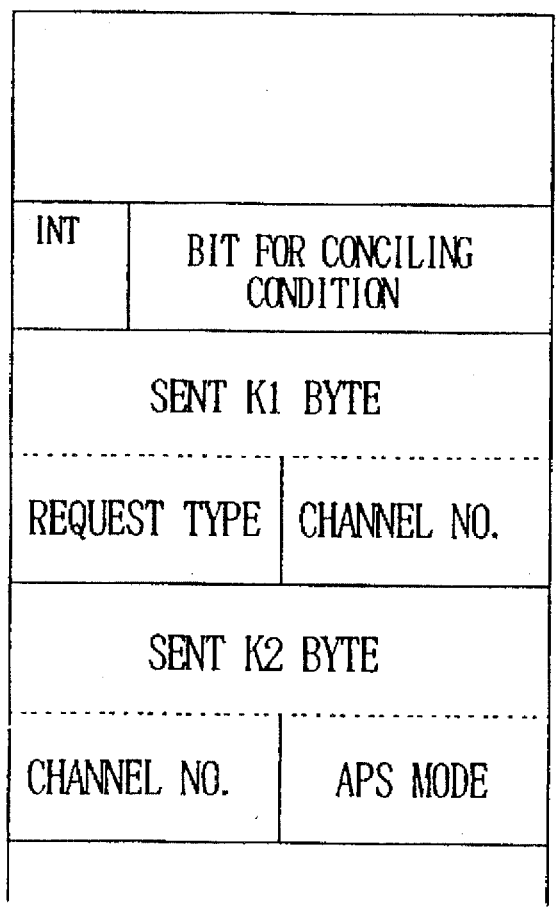
FIG. 7 is a diagram showing a signal format from the fiber interface common card to the fiber interface card according to the first feature of the present invention.
Figure 8:
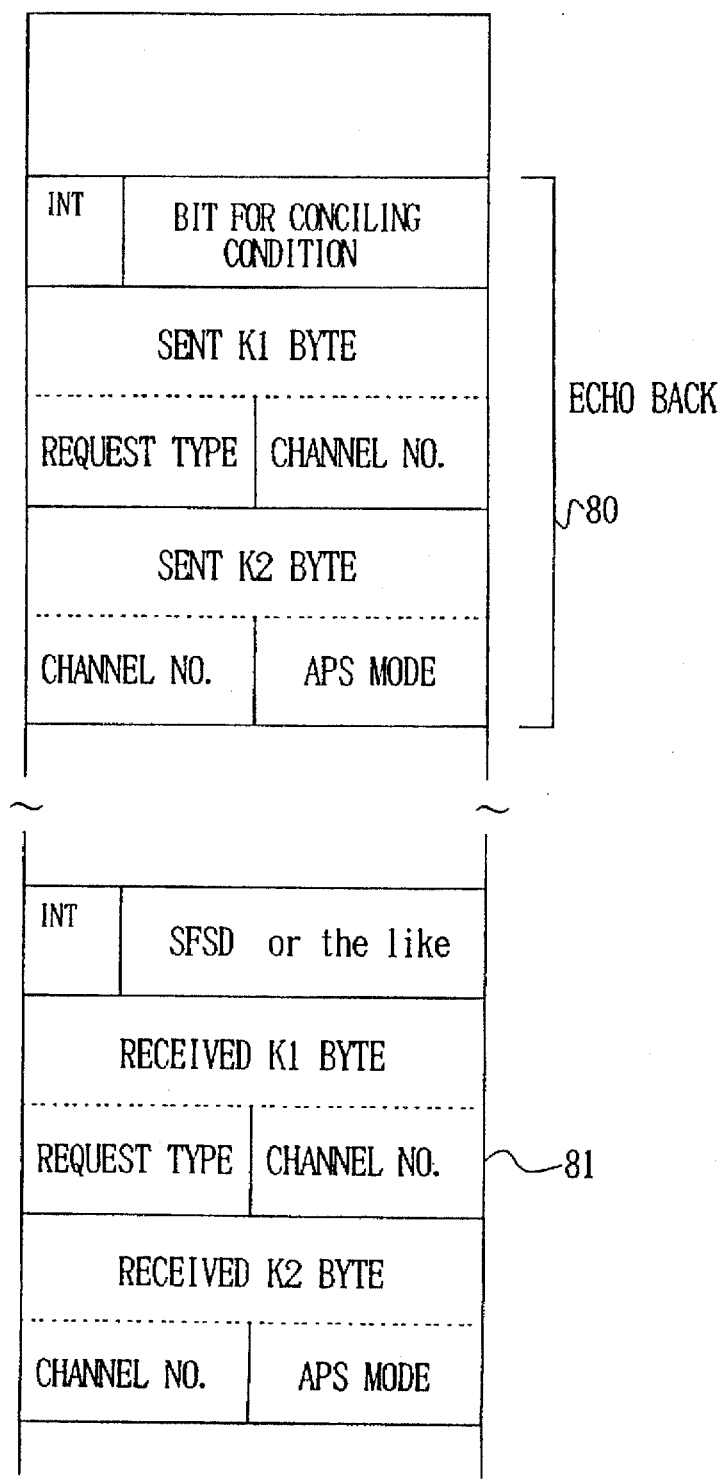
FIG. 8 is a diagram showing a signal format sent from the fiber interface card to the fiber interface common card according to the first feature of the present invention.

Referring now to FIGS. 7 and 8, an example of the control signal format according to the present invention is shown. Shown is a format transmitted between the internal control signal transmitter 102 in the fiber interface card 10 shown in FIGS. 2 and 4 and the internal control signal transmitter 208 in the fiber interface common circuit 20 shown in FIGS. 3 and 5.

FIG. 7 illustrates a format of the signal transmitted from the internal control signal transmitter 208 in the fiber interface common card 20 to the internal control signal transmitter 102 in the fiber interface card 10 according to the first feature of the present invention. FIG. 8 shows a format of the signal echoed from the internal control signal transmitter 102 in the fiber interface card 10 back to the internal control signal transmitter 208 in the fiber interface common card 20, when receiving the signal sent from the internal control signal transmitter 208 in the fiber interface common card 20.

That is, as shown in FIG. 7, the signal outputted from the internal control signal transmitter 208 in the fiber interface card 20 has an INT, which is a bit for reconciling the condition between the fiber interface common cards 20 and 21. Further, in FIG. 7, the format includes K1/K2 bytes.

By referring the bit for reconciling the condition, it can be judged that the condition of the fiber interface common card 20 is not corresponding to that of the fiber interface Common card 21. In this case, the signal has been changed. Therefore, it becomes apparent that the contents of the condition table in the fiber interface common card 20 (refer to 201 shown in FIG. 1), that is, the contents of the condition table 201 corresponding to the memory existing in the micro processor 581, as shown in FIG. 5, should be rewritten.

Further, FIG. 8 illustrates a signal format sent from the fiber interface card to the fiber interface common card. The format has two format areas 80 and 81. Data illustrated in the format area 80 means a signal format, which is echoed from the fiber interface common card back to the fiber interface card, as it is. Accordingly, the signal format is the same as shown in FIG. 7. Further, the format area 81 means a signal including the fault detected in the fiber interface card and a control signal received from the faced switch.

Figure 9:
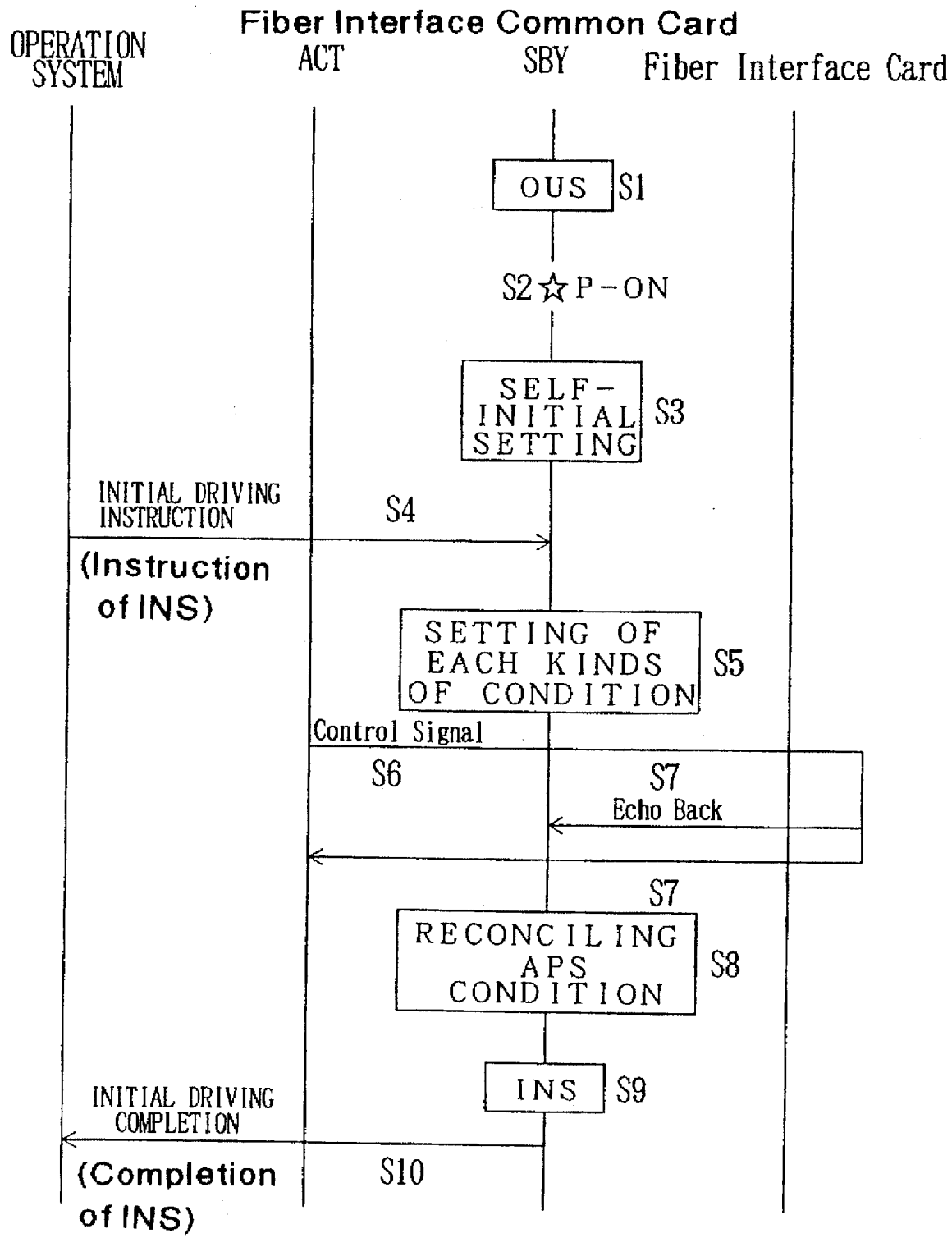
FIG. 9 is a diagram showing a sequence for initial driving of the fiber interface common card according to the first feature of the present invention.

FIG. 9 is a diagram showing a sequence for initial driving of the fiber interface common card according to the first feature of the present invention. First, the fiber interface common card, which is in SBY (standby) condition is in OUS (Out of Service) condition (STEP S1). Power is supplied to the fiber interface common card in the OUS (Out of Service) condition (STEP S2). Then, self-initial setting of fiber interface common card, which is in SBY (standby) condition, is performed (STEP S3).

Secondly, initial driving of the fiber interface common card, which is in SBY (standby) condition, is performed according to the driving instruction included in the internal control signal transmitted from the main processor of the ATM switch, based on OS (Operation System) in the ATM switch, not shown in the diagram (STEP S4).

On the initial driving of the fiber interface common card, the setting of each kinds of conditions is performed (STEP S5). The internal control signals are continually sent from the fiber interface common card, which is in ACT (active) condition to the fiber interface card (STEP S6). In comparison, as described in the explanation of the signal format shown in FIGS. 7 and 8, the sent internal control signals are echoed back to the working and protection fiber interface common cards 20 and 21 from the fiber interface cards (STEP S7).

Consequently, the fiber interface common card, which is a SBY (standby), can reconcile an APS condition to that of the fiber interface common card, which is ACT (active) (STEP S8). Therefore, the fiber interface common card, which is SBY (standby), can be INS (In Service) (STEP S9). If the card becomes INS condition, it can inform the completion of initial driving to the OS from the fiber interface common card, which is SBY (standby) (STEP S10), and can switch to the ACT (action) condition.

Figure 10:
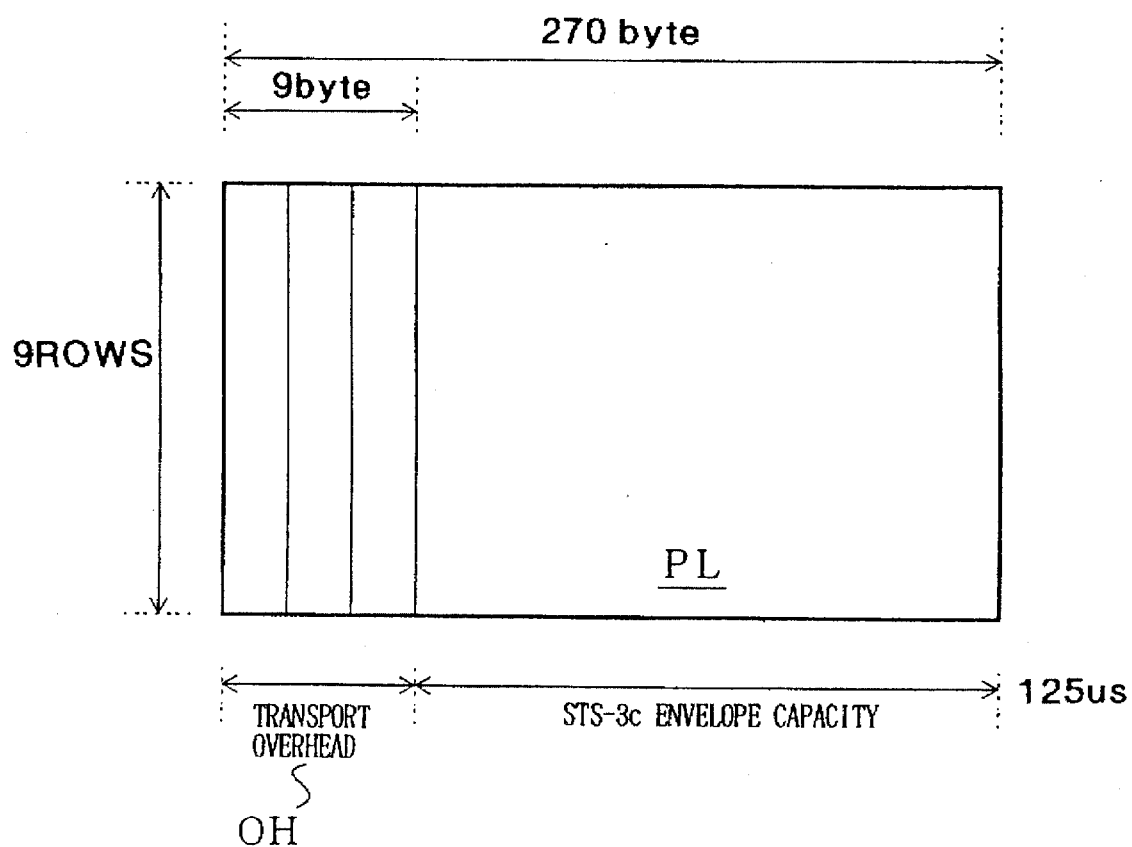
FIG. 10 is a diagram for explaining an entire SONET flame structure.

A frame structure of the above-described main signal will be explained in accompanying with an example of SONET frame. FIG. 10 is a diagram for explaining an entire SONET frame structure, when a transmitting bit rate is 155.52M bits. The frame is formed with the size of 270 bytes×9 rows, and has an overhead section OH and a payload section PL. If the transmitting speed is 622.08M bits, an entire SONET frame structure has fourth as large as the size of the frame shown in FIG. 10, i.e., the size of 1080 bytes×9 rows.

Figure 13:
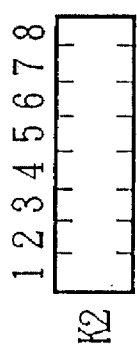
FIG. 13 is a diagram for explaining the definition of K2 byte.

The structure of overhead section OH is as shown in FIG. 11. K1/K2 bytes are positioned as shown in FIG. 11. Further, the definitions of contents of K1 and K2 bytes are as shown in FIGS. 12 and 13. As is apparent from FIGS. 12 and 13, K1 byte expresses the request type (in bits 1 to 4), and the use of lines (in bits 5 to 8).

Meanwhile, the K2 byte expresses channel information (in bits 1 to 3), an APS architecture (in bit 5), and an information of operation, such as a distinguish of unidirectional/bidirectional transmission (in bits 6 to 8).

A plurality of ATM cells are provided on the payload section PL. The control cells multiplexed in the multiplexers 46 (refer to FIG. 4) and 204 (refer to FIG. 5) are also on the payload section PL, besides the data cells transmitted between switches.

In the above-described embodiment according to the present invention, the contents of the condition table 201 can be commonly updated by echoing from the fiber interface common card, which is in ACT group back to the working and protection fiber interface common cards 20 and 21 to reconcile the APS condition between the working and protection fiber interface common cards 20 and 21.

Figure 14:
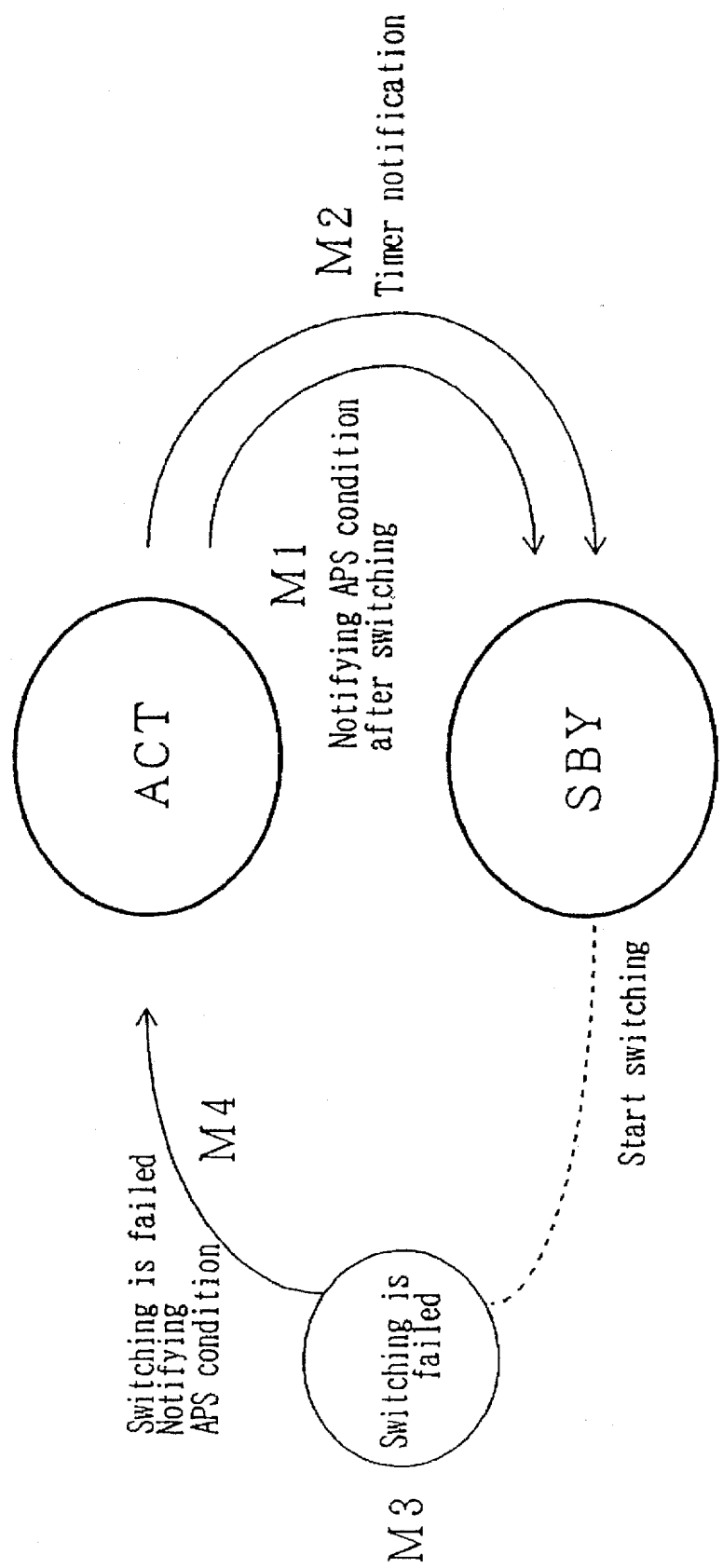
FIG. 14 is a diagram for explaining the operation for notifying condition.

FIG. 14 is a diagram for explaining other operation for notifying condition to reconcile the APS condition of the working and protection fiber interface common cards 20 and 21. In FIG. 14, when completing the switching, the ACT group notifies the APS condition to the SBY group with due regard to the case where only the ACT group detects a fault and drives the APS.

A procedure for notifying the APS condition is one of the features of the present invention. The fiber interface common card of the ACT group notifies the APS condition to the fiber interface common card of the SBY group after switching (M1) or notifies the APS condition at predetermined intervals (timer notification: M2).

When a fault is detected in only the SBY group between a timer notification and the next timer notification, and the APS is driven, the APS is failed because the fault is detected in the SBY group (M3). Therefore, the fact of failure of switching APS and the APS condition of the SBY group are notified to the fiber interface common card of the ACT group (M4).

Accordingly, the APS condition of the ACT group becomes to correspond to that of the SBY group. Then, the APS is driven from the fiber interface common card of the ACT group, again.

FIG. 15 is a diagram for explaining one example of APS condition data in the condition table 201. The contents of condition table 201 includes data of (a) showing whether the used line, which is currently in an ACT condition, is working or protection, (b) showing what the reason for switching is (such as a switching with a command, a switching due to the fault detection or the like), (c) showing where the switching is performed (whether the switching is performed on the own switch or the faced switch), (d) showing the switched condition (success or failed), and (e) showing failure condition or the like.

The working and protection fiber interface common cards 20 and 21 commonly hold the APS condition data in the condition tables 201.

Figure 16:
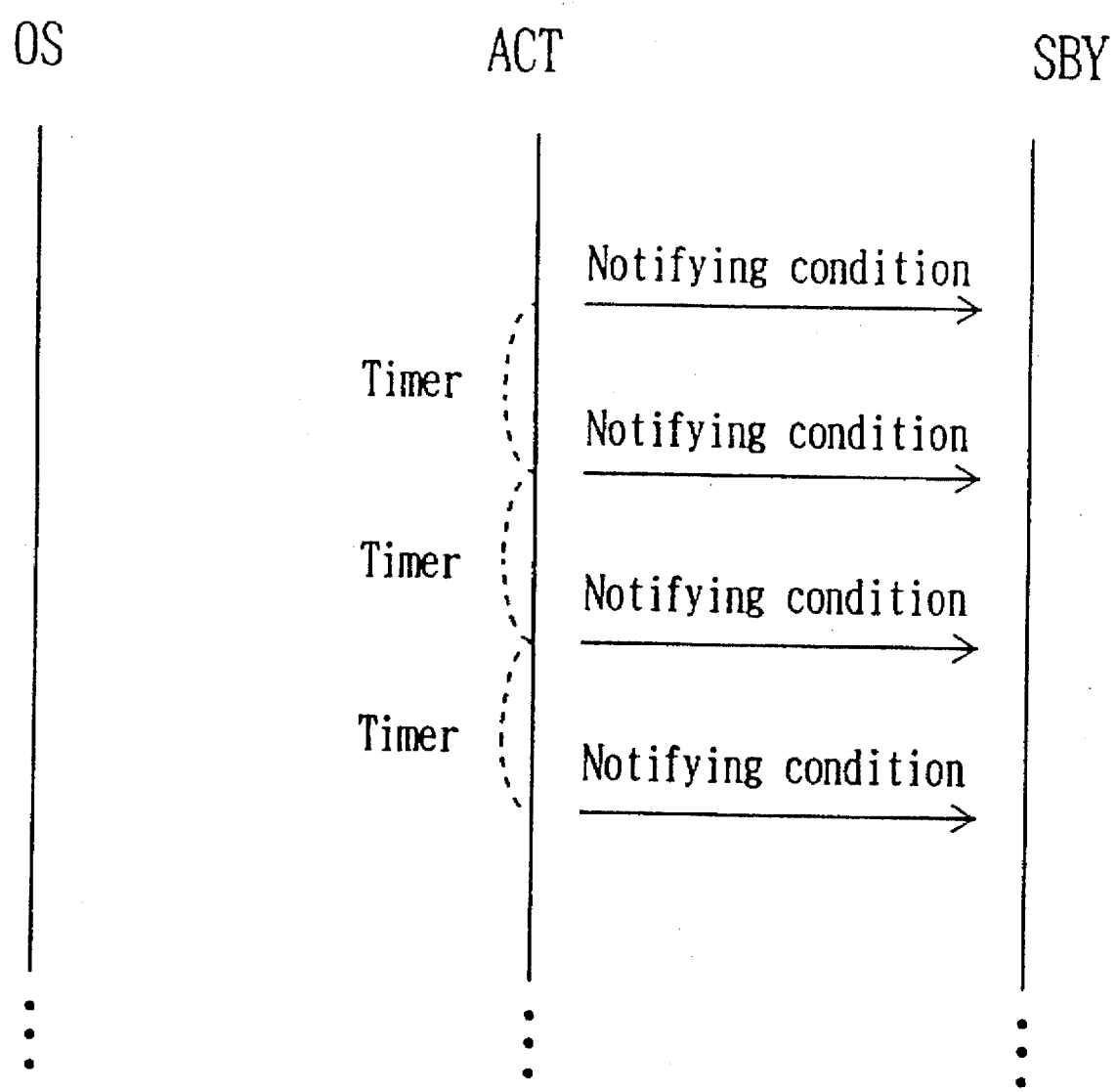
FIG. 16 is an example of a procedure for notifying condition.

FIG. 16 is an example of a procedure for the above-described timer notification. This procedure is featured in notifying the condition from the fiber interface common card of the ACT group to the fiber interface common card of the SBY group at predetermined intervals. The interval is set on a timer. Therefore, it becomes possible to continually reconcile the APS condition of the ACT group to that of the SBY group.

Figure 17:
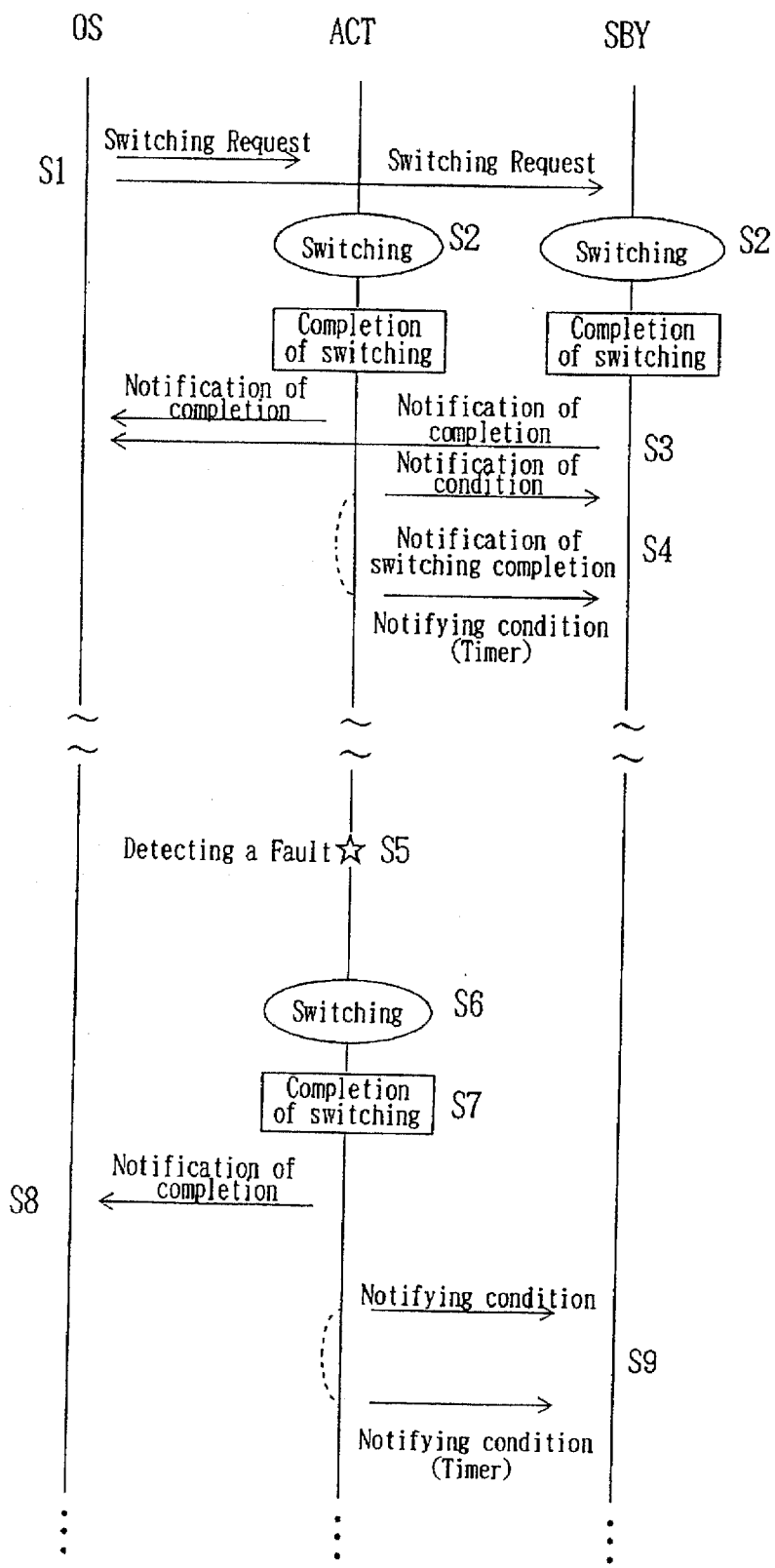
FIG. 17 is an explanatory diagram showing another example of a procedure for notifying condition.
Figure 26:
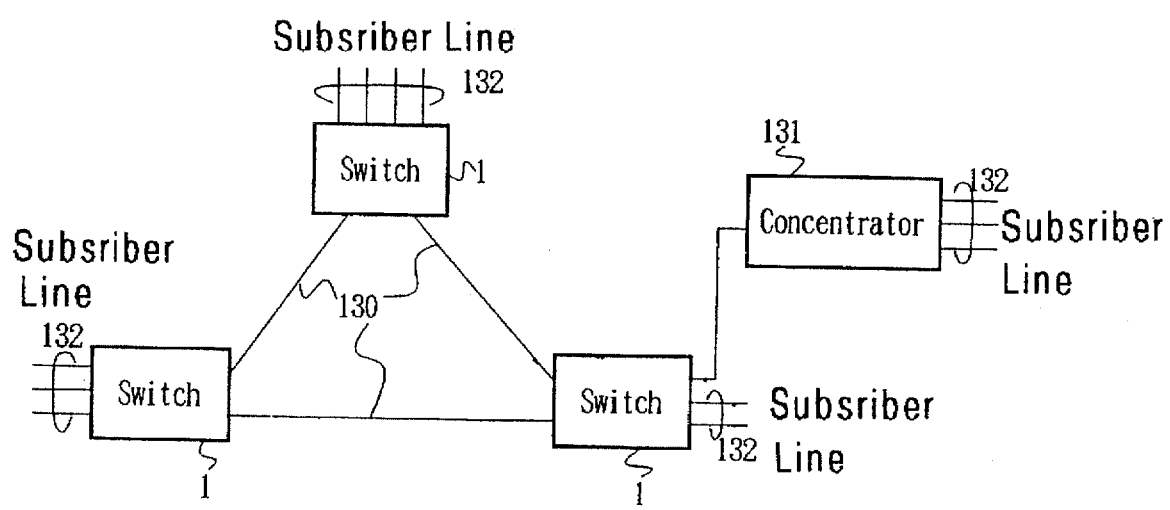
FIG. 26 is an explanatory diagram of a structural example of Broadband ISDN system.

FIG. 17 is an explanatory diagram showing other procedure for notifying the condition. In FIG. 17, when a switching request is sent from the OS (refer to FIG. 26) (STEP S1), both the ACT and SBY groups switch according to the request (STEP S2). When completing the switching, the completion is notified to the OS, respectively (STEP S3).

After completing the switching normally in the ACT group, the notification of condition is sent to the SBY group at predetermined intervals (STEP S4).

When a fault is detected in the ACT group, not by the request sent from the OS (STEP S5), the APS is performed (STEP S6). After completing the switching operation normally in the ACT group (STEP S7), the notification showing the completion of switching is notified to the OS (STEP S8). After that, as described in FIG. 16, the notification of condition is sent to the SBY group at predetermine intervals, simultaneously (STEP S9).

Figure 18:
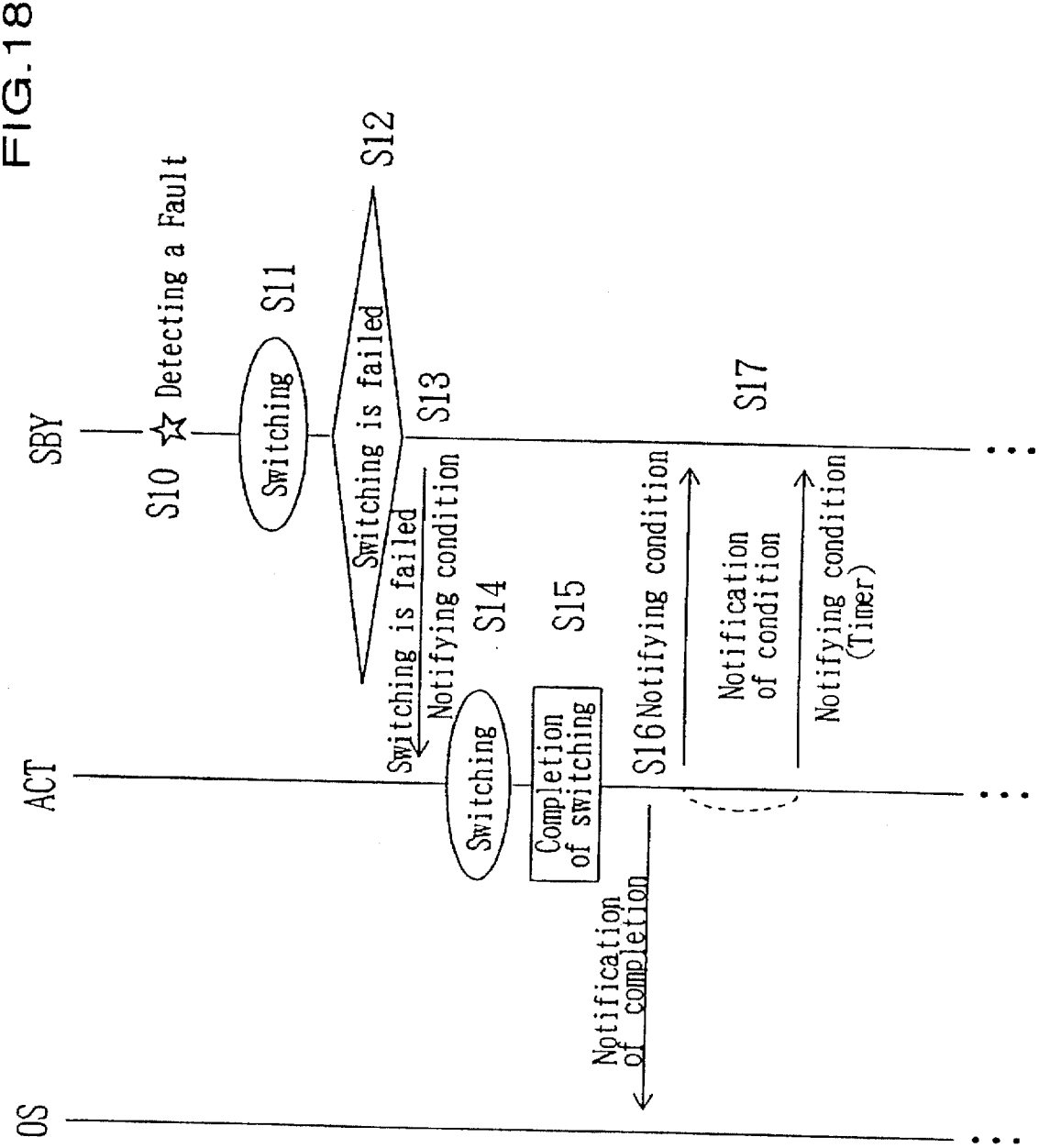
FIG. 18 is an explanatory diagram of switching and a procedure for notifying condition when a fault is detected in only a SBY group.

FIG. 18 is an explanatory diagram of other example of a procedure for notifying the condition. More particularly, it is a diagram for explaining the switching and the procedure for notifying the condition when a fault is detected in only the SBY group. When a fault is detected in the SBY group (STEP S10), the condition table of ACT group is updated to operate the SPS (STEP S11).

However, the switching APS in the SBY group is failed, as the fiber interface card transmits the K1/K2 byte to the fiber interface common card of the ACT group (STEP S12). Then, the contents of the condition table of the SBY group is notified, when the fiber interface common card of the SBY group is failed to switch (STEP S13).

Switching succeeds here for a first time (STEP S14), and when completing the switching (STEP S15), the completion of switching is notified to the OS, as well as the step S8 shown in FIG. 17 (STEP S16).

Similarly to the repeated explanation described above, the notification of condition is sent to the SBY group at predetermined intervals (STEP S17). Accordingly, the contents of the condition table 201 of the ACT group can be continually corresponding to that of the SBY group.

Figure 19:
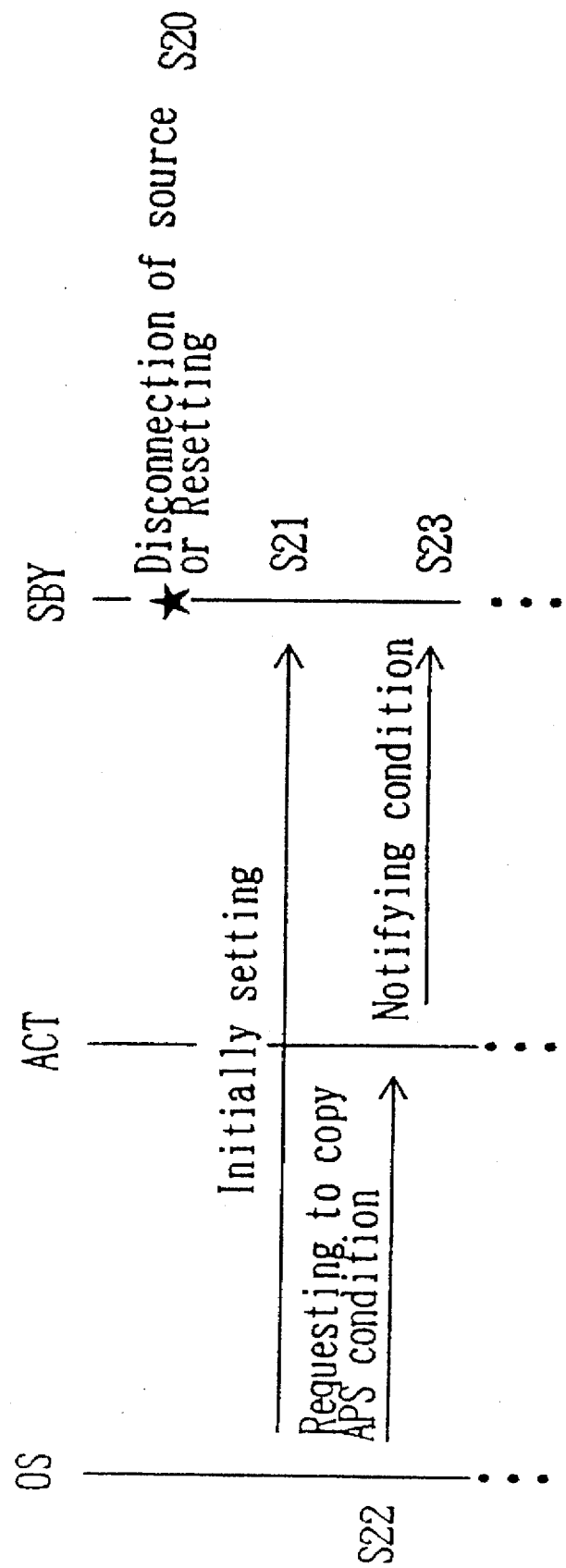
FIG. 19 is a diagram for explaining a procedure for notifying condition when driving due to a fault of one group and resetting.

FIG. 19 is a diagram for explaining a procedure for notifying condition when driving due to a fault of one group or resetting.

Further, as shown in FIG. 19, the system is driven because of disconnecting the electric source in one group or resetting (STEP S20). After initially setting the SBY group (STEP S21), a request for copying is sent from the OS to the ACT group (STEP S22), and the contents of the condition table 201 is notified from the ACT group to the SBY group to respond to the request for copying (STEP S23). Therefore, the APS condition of the SBY group can be corresponding to that of the ACT group.

The above-described notification of contents in the condition table 210 from the ACT group to the SBY group and the notification of switching failure from the SBY group to the ACT group are performed by employing registered information of 2 bytes, not shown in the diagram.

Figure 20:
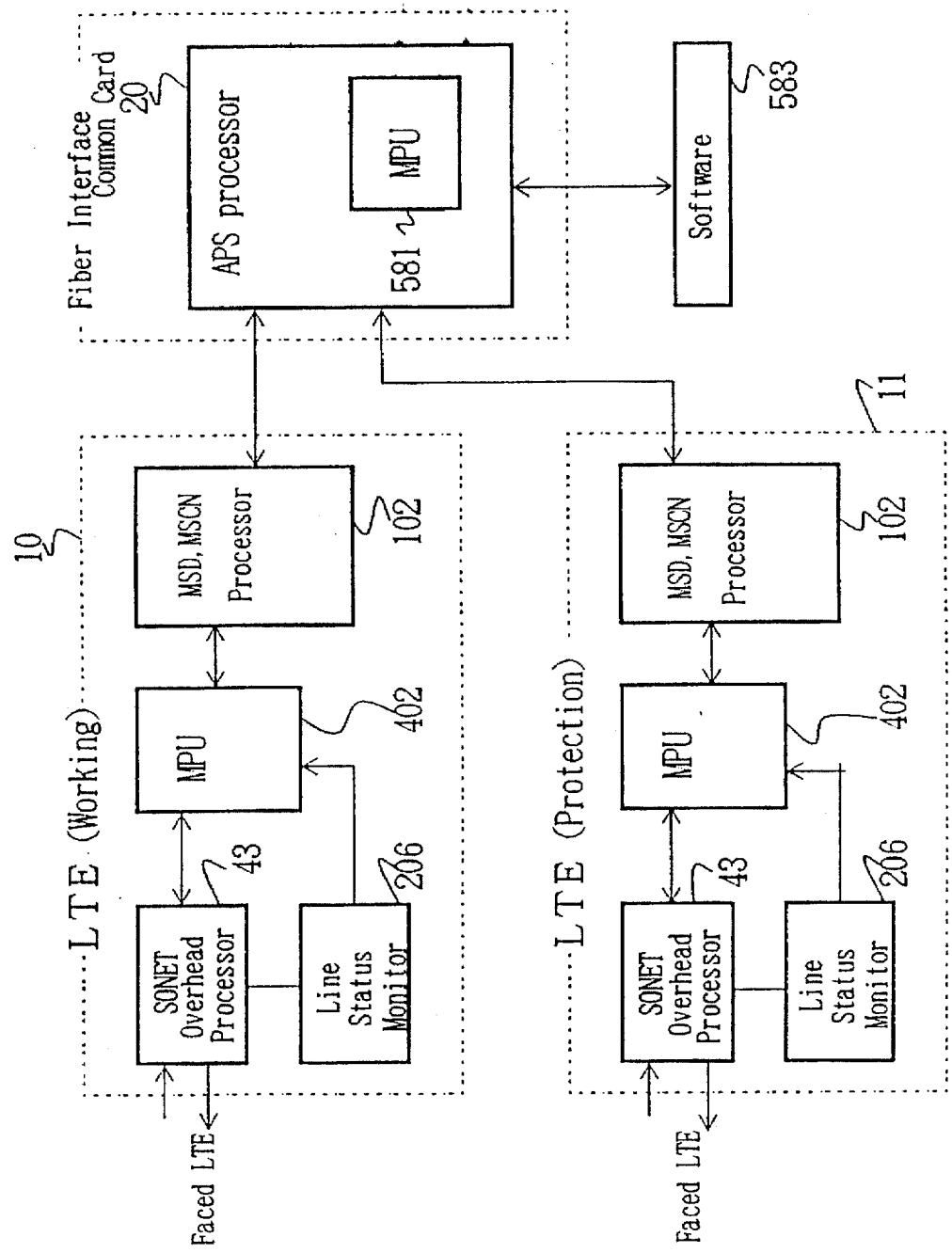
FIG. 20 is an explanatory diagram of a principle according to the second feature of the present invention.

FIG. 20 is a block diagram showing a principle according to the second feature of the present invention. More particularly, FIG. 20 shows an structural example of the internal control signal transmitter 102 for an APS system. As explained above, since switching should be completed within 50 ms in the APS system, switching is performed by a hardware or a firmware without an interposition of software.

Accordingly, FIG. 20 shows only the components, which are directly related to the second feature of the present invention in comparison with FIGS. 4 and 5. The same reference numerals are used to denote and identify corresponding or identical components. In FIG. 20, reference numeral 10 and 11 are working and protection fiber interface cards, and 20 is a fiber interface common card. FIG. 20 shows an example of the simplex fiber interface common card 20 connected to the duplexed fiber interface cards 10 and 11.

A micro processor 581, which is controlled with a software 583, is provided in the fiber interface common card 20. An internal control signal transmitter 102, a micro processor 402, a SONET overhead processor 43 and an internal control signal processor 206 are provided in each of the fiber interface cards 10 and 11.

The SONET overhead processor 43 extracts and holds each byte data in the overhead OH of the SONET frame (refer to FIG. 10) received from the faced switch side. Further, the SONET overhead processor 43 sets a sending overhead data notified by the micro processor 402 to each byte is the overhead OH of the SONET frame, and sends the data to the faced switch.

The line status monitor circuit 206 monitors a bit error rate on the line, frame synchronization or the like per one frame unit, and counts the number of errors per each monitoring item. The microprocessor 402 reads the counted information, and notifies the information to the internal control signal transmitter 102, if the information becomes a condition for driving the APS.

Further, the micro processor 402 sends data showing whether or not the APS driving condition exists, to the fiber interface common card 20,, via the internal control signal transmitter 102. Accordingly, the fiber interface common card 20 can control to select and switch the working or protection fiber interface card. The fiber interface common card 20 selects either of the fiber interface cards and then, selected one of the fiber interface cards is connected to the fiber interface common card 20.

As described above, according to the second feature of the present invention, APS control can be performed by a hardware, without an interposition of software.

Figure 21:
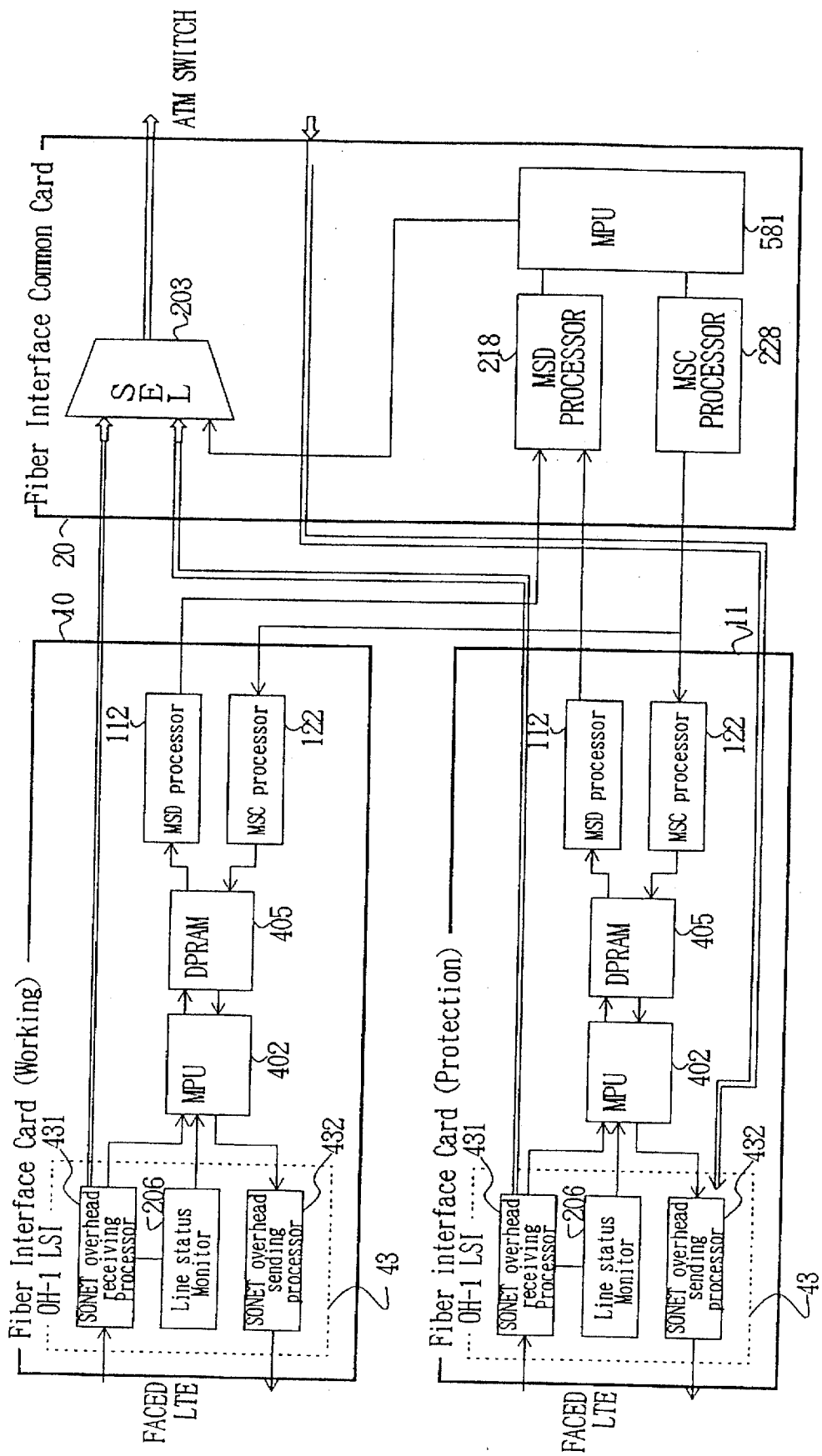
FIG. 21 is a block diagram of an embodiment according to the second feature of the present invention.

FIG. 21 is a detailed block diagram of an embodiment according to the second feature of the present invention. In FIG. 21, only the components, which are directly related to the second feature of the present invention are shown. Each of the fiber interface cards 10 and 11 has a SONET overhead processor 43 including a SONET overhead receiving processor 431 for signals sent in the upward direction and a SONET overhead sending processor 432 for signals sent in the downward direction. These SONET overhead receiving and sending processors 431 and 432 and an internal control signal processor 206 can be formed with single LSI chip.

Further, the internal control signal transmitter 102 is divided into a MSD processor 112 and a MSC processor 122. The processors 112 and 122 are connected to a micro processor 402 via a dual port RAM 405. Main signals sent from the SONET overhead receiving processors 431 in the working and protection fiber interface cards 10 and 11 are inputted to a selector 203, which switches and selects the ACT group, in the fiber interface common card 20.

A micro processor 581 in the fiber interface common card 20 controls the selector 203 to switch and output a main signal from one fiber interface card. The control of the micro processor 581 is determined based on whether data sent from the line status monitor circuit 206 to the MSD processor 218 in the fiber interface common card 20, which is provided in correspondence with the MSD processor 112 in the fiber interface card reaches.

More particularly, the micro processors 402 in the fiber interface cards 10 and 11 read out data of K1/K2 bytes (refer to FIG. 11) in the overhead OH from the data received by the SONET overhead processors 431. Then, the processors 402 notifies the data to the MSD processors 112, which are a part of the internal control signal transmitter 102 shown in FIG. 20, via a dual port RAMs 405.

Further, the processors 402 read each number of errors of monitoring items of lines from the line status monitor circuit 206. If the number is corresponding to the condition for driving APS, the processors 402 simultaneously notify that to the dual port RAMs 405.

In this case, the processors 402 read the above-described received data of K1/K2 bytes, a number of errors of line monitoring items or the like per 5ms. When the received data of K1/K2 bytes are modified, or the APS is driven, the processors 402 also notifies the modification to the MSD processors 12. Further, the processors 402 read the K1/K2 byte sent from the MSC processor 122 per 5 ms, and notify it to the SONET overhead sending processors 432.

Each of the MSD processors 112 analyzes data of K1/K2 bytes notified from each of the micro processors 402, the condition of line quality, and the notification of modification of data, judges the priority for switching, and notifies switching of the employed fiber interface card or K1/K2 byte data sent to the faced fiber interface card according to the switching to the MSD processor 218 in the fiber interface common card 20. If the sent data of K1/K2 bytes have been changed, each of the MSD processors 112 notifies the modification with new data.

This notification is performed on the basis of a signal format as shown in FIG. 8. Further, the existence of the modification in data of K1/K2 byte is judged whether or not INT bit is 1 or 0, as described in FIGS. 7 and 8.

In this case, if the notification of the modification is received, an interruption request is sent to the micro processor 581 in the fiber interface common card 20, so that it becomes possible to execute the APS processing by the periodical data processing, immediately.

As described above, according to the second feature of the present invention, it is possible to control switching with only a hardware or a firmware without an interposition of software, and control the K1/K2 data. If an APS related data to be sent to the internal control signal transmitter 102, and the fiber interface common cards is varied, the micro processor 581 executes an interruption processing, so that the time required for switching can be reduced.

Figure 22:
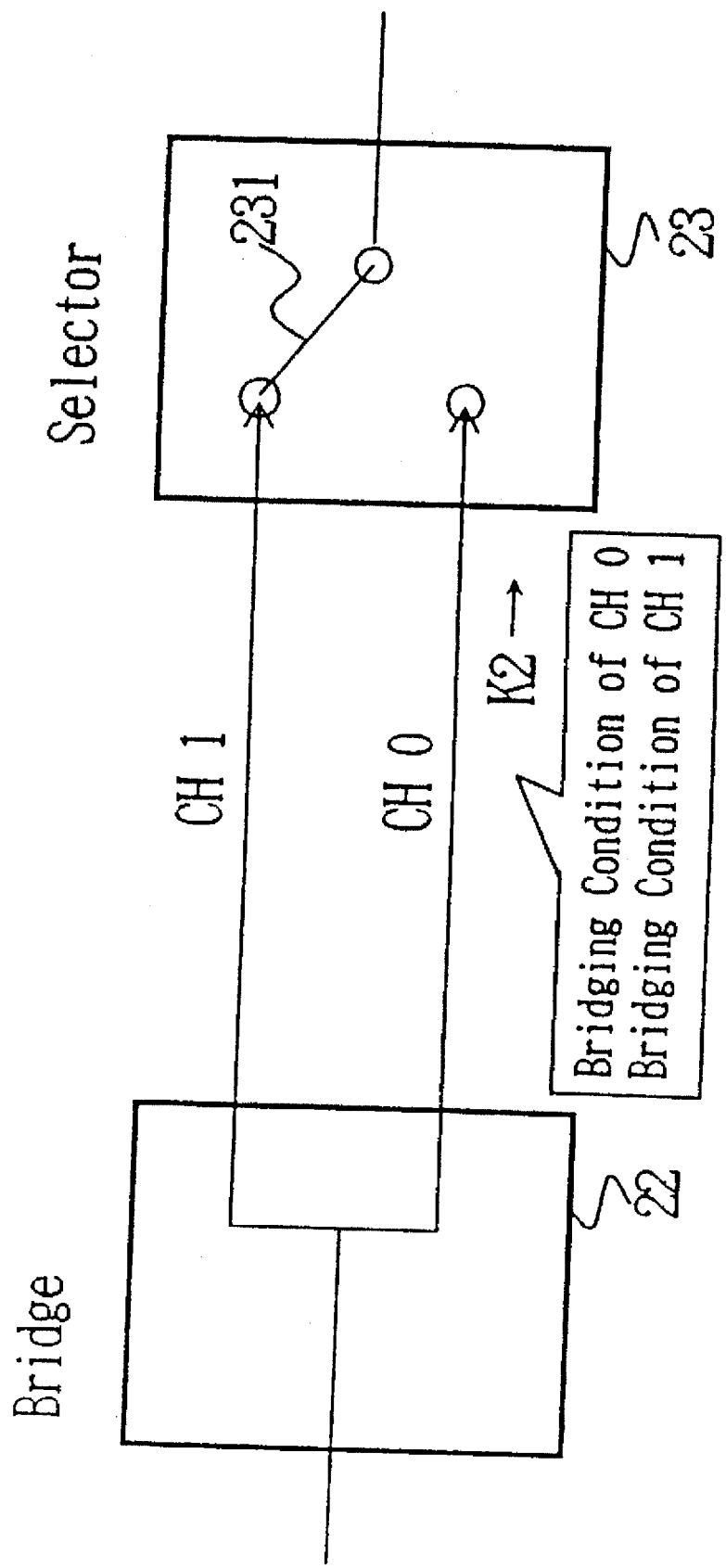
FIG. 22 is an explanatory diagram of principle according to the third feature of the present invention.

FIG. 22 is a block diagram of a principle according to the third embodiment of the present invention. Continuous bridging to the working (CH1) side and the protection side (CH0) is the same as that of the 1+1 conventional system. However, in the conventional system, the condition of line disconnection (fault or under the maintenance) cannot be notified to the faced side. In the present invention, it is possible to continuously notify the condition to the faced side.

In the third feature of the present invention, the condition of bridge per a transmission line on the K2 byte sent via the protection (CH0) line is notified from a bridge 22 to a selector 23. If the selector 23 detects a fault, the lines are switched by the judgment according to the condition shown on K2 byte.

Figure 23:
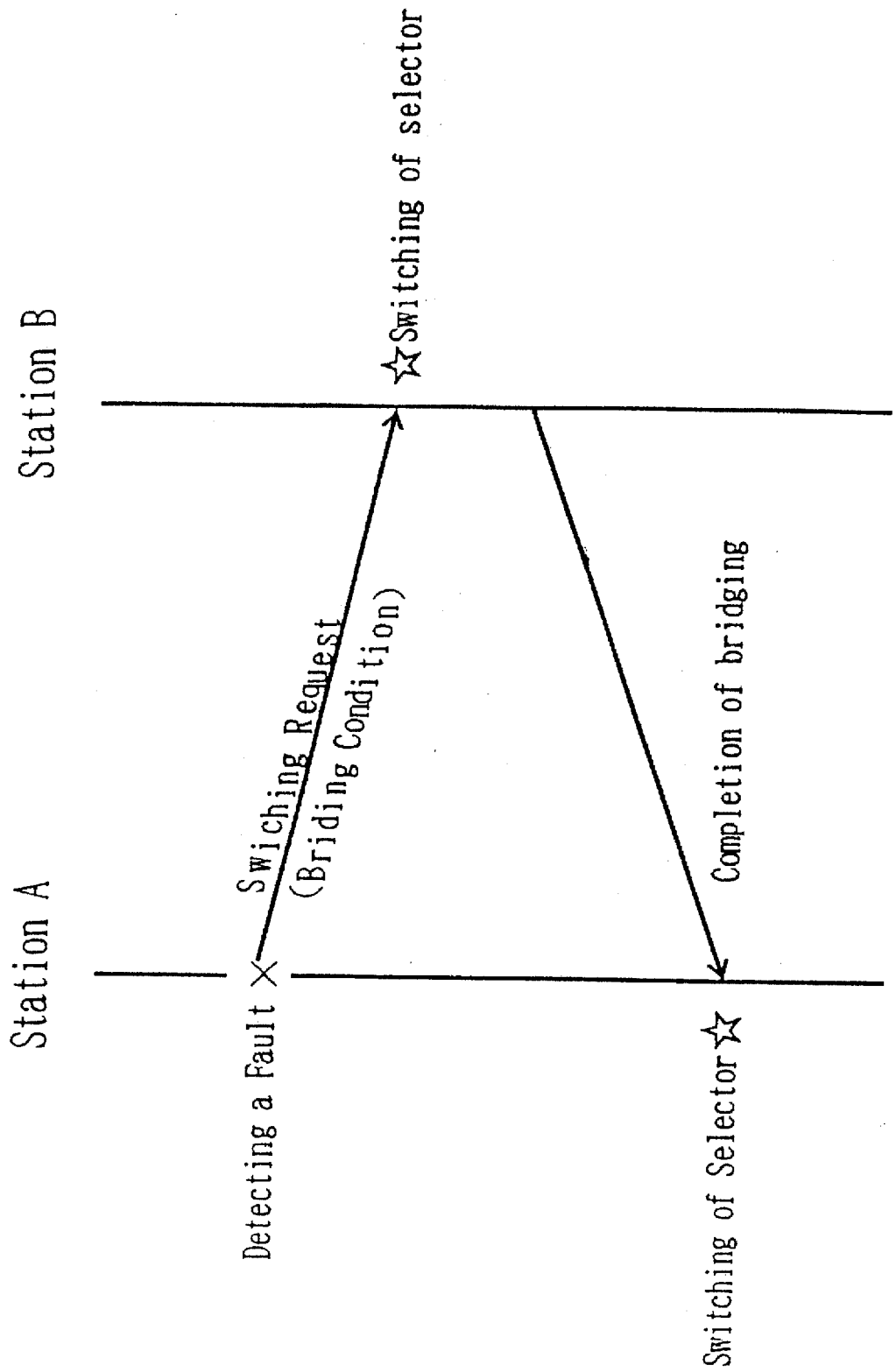
FIG. 23 is a diagram for explaining a switching sequence according to the third feature of the present invention.

As described in an operation sequence shown in FIG. 23, the condition of bridge indicated on K2 byte and switching request indicated by k1 byte are sent from the switch A (bridge 22) to the switch B (selector 23). The switch B judges whether or not the line is switched, when it receives the condition and the switching request, and switches the selector 231. After switching, the switch B notifies the completion of bridge to the switch A.

Accordingly, in comparison with a sequence of the conventional switching system shown in FIG. 31, a procedure for switching becomes easier, so that the time required for switching can be reduced.

Figure 24:
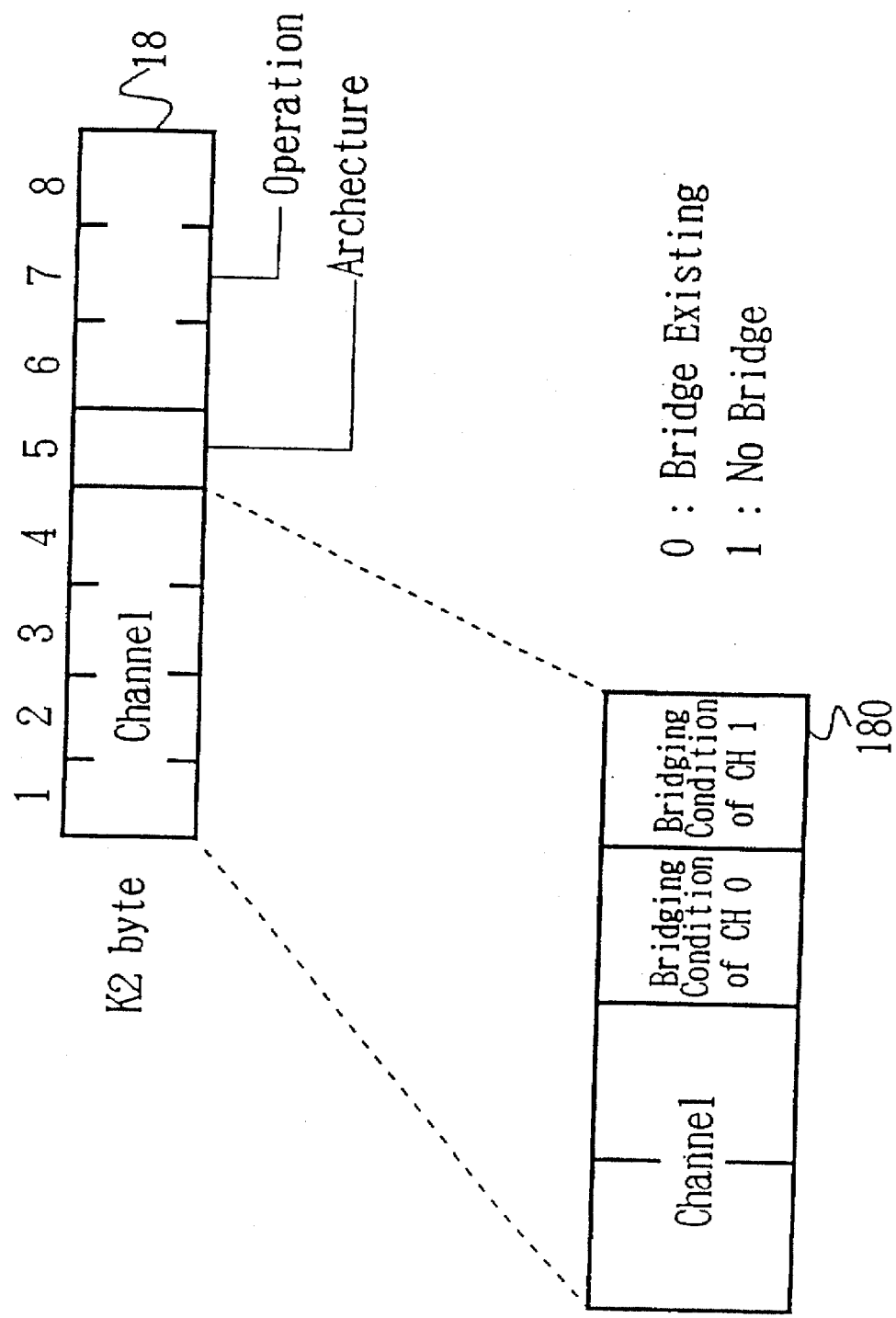
FIG. 24 is an explanatory diagram of an embodiment according to the third feature of the present invention.

FIG. 24 is an example of bridge condition on K2 byte, described above. In FIG. 24, reference numeral 18 is a structure of the K2 byte. In the structure, the first to fourth bits express CH numbers.

The third bit expresses a condition of bridge of working (CH1) group. The fourth bit expresses a condition of bridge of protection (CH0) group (refer to 180 shown in FIG. 24). Then, "0" bit expresses bridge existence, while "1" bit expresses no bridge existence.

Figure 25:
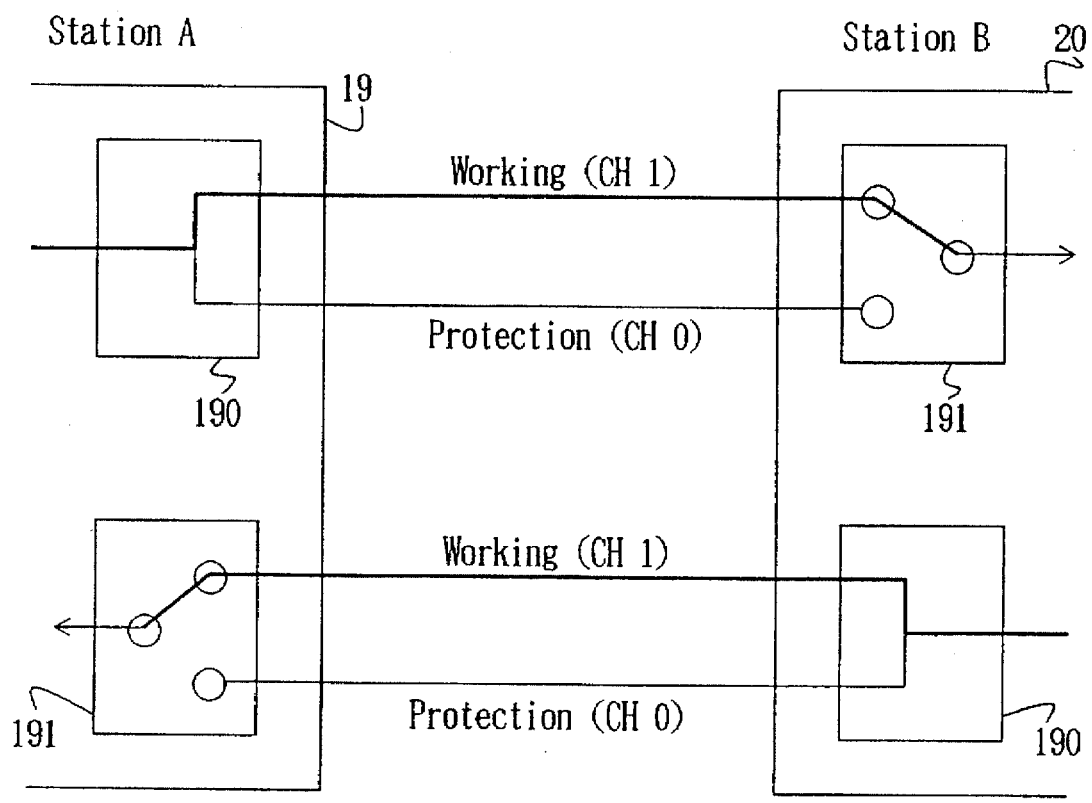
FIG. 25 is an explanatory diagram of the extended applied example according to the third feature of the present invention.

FIG. 25 is an explanatory diagram of the extended embodiment according to the third feature of the present invention. The third feature is employed to bi-directional mode. That is, an upward line from the switch A to the switch B provides working (CH1) and protection (CH0) lines, and the both lines are bridged in the switch A.

The downward line from the switch B to the switch A further provides working (CH1) and protection (CH0) lines, and the both lines are bridged in the switch B. Accordingly, if the working (CH1) and protection (CH0) lines are switched in the upward and downward lines according to a fault, the time required for switching can be reduced according to the third feature of the present invention.

As explained in the above-described embodiments, according to the first feature of the present invention, it is possible to reconcile the condition at initially driving the fiber interface common card of the SBY group to that of the fiber interface common card of the ACT group. Therefore, it is also possible to easily monitor the APS condition between the fiber interface common cards.

If a fault, which is detected in only a fiber interface common card of one group due to the characteristic, is found, it is possible to continually make the APS condition of ACT and SBY groups in common by notifying the condition from the ACT group as a predetermined interval goes by.

Further, according to the second feature of the present invention, it is possible to switch the lines by a hardware or a firmware without an interposition of software. Therefore, the time required for switching can be reduced.

Furthermore, according to the third feature of the present invention, it is possible to immediately switch the lines at the switching request by continually notifying the condition of bridge of both lines of working and protection groups. The time required for switching can be also reduced.

Although the present invention has been described with reference to embodiments, the present invention is not restricted to those. The scope of the present invention being indicated by the appended claims rather than by the foregoing description and all changes which come within the meaning and range of equivalency of the claims are therefore intended to be embraced therein.

What is claimed is:

1. A line switching system for switching transmission lines between working and protection groups for use in a duplexed fiber interface shelf, the line switching system comprising:
    a pair of duplexed line switching controllers for sending a line switching control signal to switch the transmission lines; and
    a pair of duplexed line interface devices operatively connected to the pair of duplexed line switching controllers, an active line interface device of the duplexed line interface devices for receiving the line switching control signal only from an active line switching controller of the duplexed line switching controllers and echoing the received control signal back to the duplexed line switching controllers.

2. The line switching system according to claim 1, wherein the duplexed line switching controllers are connected to asynchronous transfer mode switch modules and the duplexed line interface devices are connected to optical fiber transmission lines.

3. The line switching system according to claim 2, wherein the duplexed line switching controllers include memory means having a condition table for storing the line switching control signal which is echoed back from the active interface device, and refer the line switching control signal stored in the condition table at the initial driving of a standby line switching controller, so that a condition for switching the transmission lines is reconciled between the pair of the duplexed line switching controllers.

4. The line switching system according to claim 1, wherein the line switching control signal includes information whether modification in condition for switching transmission lines exists or not, and switching information provided in an overhead of a SONET frame.

5. The line switching system according to claim 2, wherein each of the duplexed line interface devices has;
    an overhead receiver for receiving an overhead of the SONET frame,
    an overhead sender for sending the overhead of the SONET frame, and
    a microprocessor operatively connected to the overhead sender for controlling the overhead sender to insert a switching information to a main signal according to the line switching control signal and to send contents of the switching information provided in the overhead of the SONET received by the overhead receiver to the line switching controllers.

6. The line switching system according to claim 5, wherein there is further comprised a dual port RAM, through which the line switching control signal and the switching information of the overhead are transmitted between the micro processor and the line interface devices.

7. A line switching system for switching transmission lines between working and protection groups for use in a duplexed fiber interface shelf, the line switching system comprising:
    duplexed fiber interface cards connected to the transmission lines, each having a condition table for storing condition of automatic protection switching; and
    duplexed fiber interface common cards operatively connected to the duplexed fiber interface cards, of which an active group notifies the condition of the automatic protection switching stored in the condition table to the fiber interface common card of a standby group at predetermined intervals.

8. The line switching system according to claim 7, wherein the fiber interface common card of the active group further notifies the condition of the automatic protection switching to the fiber interface common card of the standby group, when the automatic protection switching is executed and the switching is completed.

9. The line switching system according to claim 7, wherein the fiber interface common card of a standby group notifies a failure of the automatic protection switching to the fiber interface common card of an active group, and then the automatic protection switching is driven in the fiber interface common card of the active group, when the automatic protection switching is executed, but the automatic protection switching is failed.

10. The line switching system according to claim 7, wherein the fiber interface common card of an active group notifies the automatic protection switching condition stored in the condition table to the fiber interface common card of a standby group, when either the active group or the standby group is made active.

11. The line switching system according to claim 7, wherein contents of the condition table in the fiber interface card of an active group is copied to the condition table of in the fiber interface card of a standby group, when switching of the fiber interface common cards is performed at the time of inconsistency in the automatic protection switching conditions of both the active and standby groups.

12. In a transmission system having 1+1 transmission lines where a first transmitter and a second transmitter connected by a pair of a working line and a protection line, a line switching system for switching the transmission lines for use in a duplexed fiber interface shelf, the line switching system comprising:

a bridge terminal for fixedly connecting the first transmitter to the 1+1 transmission lines of the working and protection lines; and a selection terminal for selectively connecting the second transmitter to either of the working and protection lines, the first transmitter continuously notifying a bridge condition of the working and protecting lines at the bridge terminal to the second transmitter and the second transmitter judging whether or not the selection terminal switches the working and protecting lines according to the bridge condition notified from the first transmitter, when a fault is detected at the selection terminal.

13. The line switching system according to claim 12, wherein the first transmitter sends a notification of the bridge condition of the working and protection lines to the second transmitter, using a K2 byte.

14. The line switching system according to claim 13, wherein the first transmitter further notifies a switching request to the second transmitter, using a K1 byte, and the second transmitter receives the K1 and K2 bytes showing the bridge condition and judges whether or not line switching is performed according to the received K1 and K2 bytes.

15. The line switching system according to claim 13, wherein the K2 byte provides bits, each showing bridge condition for each of the working and protection lines.

* * * * *